United States Patent [19]

Inoue et al.

[11] Patent Number: 5,893,130
[45] Date of Patent: Apr. 6, 1999

[54] IMAGE OUTPUT DEVICE

[75] Inventors: Katsumi Inoue, Nara; Tamami Hayakawa, Hirakata; Yasuhisa Hori; Noriko Wakuri, both of Yamatokoriyama, all of Japan

[73] Assignee: Sharp Kabushiki Kaisha, Osaka, Japan

[21] Appl. No.: 630,222

[22] Filed: Apr. 10, 1996

[30] Foreign Application Priority Data

Apr. 28, 1995 [JP] Japan .................................. 7-106595
May 12, 1995 [JP] Japan .................................. 7-114870

[51] Int. Cl.$^6$ ...................................... G06F 17/21
[52] U.S. Cl. ...................... 707/528; 345/150; 707/526; 707/532; 707/536
[58] Field of Search .................. 345/431, 432, 345/418, 471, 150, 154, 171, 467, 358, 302, 180, 148, 156; 348/391; 358/500, 537, 515, 521, 296; 707/500, 516, 104, 535, 526, 528, 530, 532, 536; 704/4

[56] References Cited

U.S. PATENT DOCUMENTS

| | | | |
|---|---|---|---|
| 4,286,329 | 8/1981 | Goertzel et al. | 345/467 |
| 4,412,305 | 10/1983 | Yoshida | 704/4 |
| 4,524,421 | 6/1985 | Searby et al. | 345/431 |
| 4,531,119 | 7/1985 | Nakayama et al. | 345/171 |
| 4,543,631 | 9/1985 | Kurosu et al. | 707/535 |
| 4,591,904 | 5/1986 | Urabe et al. | 358/537 |
| 4,594,674 | 6/1986 | Boulia et al. | 345/471 |
| 4,792,847 | 12/1988 | Shimazaki et al. | 358/521 |
| 4,847,604 | 7/1989 | Doyle | 345/180 |
| 4,931,953 | 6/1990 | Uehara et al. | 345/467 |
| 4,949,279 | 8/1990 | Takakura et al. | 345/418 |
| 5,010,500 | 4/1991 | Makkuni et al. | 345/358 |
| 5,051,930 | 9/1991 | Kuwabara et al. | 707/516 |
| 5,136,399 | 8/1992 | Aoyama | 358/296 |
| 5,142,355 | 8/1992 | Fujima | 358/515 |
| 5,237,409 | 8/1993 | Yamaguchi | 348/391 |
| 5,241,671 | 8/1993 | Reed et al. | 707/104 |
| 5,249,263 | 9/1993 | Yanker | 345/431 |
| 5,254,978 | 10/1993 | Beretta | 345/150 |
| 5,258,831 | 11/1993 | Kato et al. | 358/500 |
| 5,299,301 | 3/1994 | Nohmi et al. | 345/431 |
| 5,311,207 | 5/1994 | Kusumoto et al. | 345/150 |
| 5,311,212 | 5/1994 | Beretta | 345/150 |
| 5,317,508 | 5/1994 | Okamoto et al. | |
| 5,319,793 | 6/1994 | Hancock et al. | 345/302 |
| 5,384,901 | 1/1995 | Glassner et al. | 345/431 |
| 5,416,890 | 5/1995 | Beretta | 345/431 |
| 5,420,607 | 5/1995 | Miller et al. | 345/156 |
| 5,432,896 | 7/1995 | Hwong et al. | 345/429 |
| 5,611,028 | 3/1997 | Shibasaki et al. | 345/431 |

FOREIGN PATENT DOCUMENTS

| | | |
|---|---|---|
| 0455351 A2 | 11/1991 | European Pat. Off. . |
| 0528599 A2 | 2/1993 | European Pat. Off. . |
| 0680018 A2 | 11/1995 | European Pat. Off. . |
| 56-46082 | 10/1981 | Japan . |
| 62-198895 | 9/1987 | Japan . |
| 2-113962 | 4/1990 | Japan . |
| 4-279980 | 10/1992 | Japan . |
| 5-258035 | 10/1993 | Japan . |

OTHER PUBLICATIONS

Allendoerfer, Carl B., and Cletus O. Oakley. "Fundamentals of Freshman Mathematics," 3d ed. New York: McGraw–Hill, 1972.

Gellert, W., H. Kustner, M. Hellwich and H. Kastner eds. "The VNR Concise Encyclopedia of Mathematics," New York: Van Nostrand Reinhold, 1977.

*Primary Examiner*—Joseph H. Feild
*Assistant Examiner*—John L. Young
*Attorney, Agent, or Firm*—Nixon & Vanderhye PC

[57] ABSTRACT

When a type of a target document is selected by an input unit from selection items displayed in a window of a display device based upon a type table, a word group of an image corresponding to the type of the document is displayed based upon an image table. When a word of the target image is selected from the word group, a color arrangement and a typeface corresponding to the image are determined based upon an image color arrangement conversion table. As a result, target color representation can be automatically displayed by an easy operation which does not require special technique and knowledge.

42 Claims, 53 Drawing Sheets

| IMAGE OF DOCUMENT | START COLOR | END COLOR | CHARACTER COLOR | TYPEFACE | RAINBOW No. | PATTERN No. |
|---|---|---|---|---|---|---|
| DELIGHTFUL | RED | YELLOW | BLUE | POP | 1 | 1 |
| ENJOYABLE | YELLOW | BLUE | RED | EDOMOJI | 1 | 1 |
| INVIGORATING | LIGHT BLUE | BLUE | RED | MINCHOTAI | 3 | 2 |
| WARM | RED | BLUE | GREEN | POP | 2 | 4 |
| FORMAL | WHITE | BLACK | BLUE | GOTHIC | 4 | 5 |
| REFINED | LIGHT BLUE | GREEN | BLACK | MINCHOTAI | 4 | 3 |
| COLD | LIGHT BLUE | BLUE | BLACK | GOTHIC | 5 | 6 |
| | | | | | | |

IMAGE COLOR ARRANGEMENT CONVERSION TABLE

MAIN ELEMENTS OF
AN IMAGE OUTPUT DEVICE

IMAGE OUTPUT DEVICE

FIG. 3

| BUSINESS DOCUMENT |
| POSTER |
| HANDBILL |
| PAMPHLET |
| NOTICE |
| CHRISTMAS CARD |
| NEW YEAR'S CARD |

8

TYPE OF DOCUMENTS
TABLE EXAMPLE

FIG. 4

```
TYPE OF DOCUMENT
◎ BUSINESS DOCUMENT
  PAMPHLET
  HANDBILL
  POSTER
  NOTICE

CHRISTMAS CARD
  FREE INPUT
```

EXAMPLE SELECTION
WINDOW DISPLAY

FIG. 5

| TYPE OF DOCUMENT | IMAGE OF DOCUMENT |
|---|---|
| BUSINESS DOCUMENT | FORMAL |
| | REFINED |
| | ⑤ |
| | POLITE |
| POSTER | BRIGHT |
| | DELIGHTFUL |
| | ⑤ |
| | ENJOYABLE |
| | BEAUTIFUL |
| PAMPHLET | DELIGHTFUL |
| | LIGHT |
| | ⑤ |
| | BRIGHT |
| ~ | ~ |

IMAGE TABLE EXAMPLE

EXAMPLE SELECTION
WINDOW DISPLAY

TYPE CONVERSION TABLE

FIG.8

| SEARCH VALUE OF FREE INPUT ↓ | CONTENTS OF IMAGE TABLE ↓ |
|---|---|
| ENJOYABLE / DELIGHTFUL | DELIGHTFUL |
| WARM / GENIAL | WARM |
| INVIGORATING / REFRESHING | INVIGORATING |
| REFINED | REFINED |

IMAGE CONVERSION TABLE

FIG. 9

| IMAGE OF DOCUMENT | START COLOR | END COLOR | CHARACTER COLOR | TYPEFACE | RAINBOW No. | PATTERN No. |
|---|---|---|---|---|---|---|
| DELIGHTFUL | RED | YELLOW | BLUE | POP | 1 | 1 |
| ENJOYABLE | YELLOW | BLUE | RED | EDOMOJI | 1 | 1 |
| INVIGORATING | LIGHT BLUE | BLUE | RED | MINCHOTAI | 3 | 2 |
| WARM | RED | BLUE | GREEN | POP | 2 | 4 |
| FORMAL | WHITE | BLACK | BLUE | GOTHIC | 4 | 5 |
| REFINED | LIGHT BLUE | GREEN | BLACK | MINCHOTAI | 4 | 3 |
| COLD | LIGHT BLUE | BLUE | BLACK | GOTHIC | 5 | 6 |

IMAGE COLOR ARRANGEMENT CONVERSION TABLE

FIG. 10

| RAINBOW No. | COLOR ARRANGEMENT | | | | | | | BRIGHTNESS | NUMBER OF SPLITS |
|---|---|---|---|---|---|---|---|---|---|
| 0 | RED | ORANGE | YELLOW | LIGHT BLUE | BLUE | INDIGO BLUE | GREEN | 80 | 7 |
| 1 | GREEN | INDIGO BLUE | BLUE | LIGHT BLUE | YELLOW | ORANGE | RED | 60 | 7 |
| 2 | BLUE | ORANGE | YELLOW | LIGHT BLUE | RED | INDIGO BLUE | GREEN | 40 | 7 |
| 3 | LIGHT BLUE | BLUE | INDIGO BLUE | RED | ORANGE | YELLOW | GREEN | 30 | 7 |
| 4 | RED | ORANGE | INDIGO BLUE | LIGHT BLUE | BLUE | GREEN | YELLOW | 10 | 7 |

RAINBOW COLOR ARRANGEMENT TABLE

FIG. 11

| INPUT CHARACTER STRING |
| --- |
| [                                           ] |

INPUT WINDOW

FIG. 12

| SET RAINBOW COLOR ARRANGEMENT | | | | | |
| --- | --- | --- | --- | --- | --- |
| FIRST [  ] | SECOND [  ] | THIRD [  ] | ~ | N-th [  ] | BRIGHTNESS [  ] |
| 1 : RED  2 : BLUE  3 : YELLOW  4 : INDIGO BLUE  5 : GREEN  6 : ORANGE  7 : LIGHT BLUE | | | | | |

RAINBOW ARRANGEMENT WINDOW

RANGE SPECIFYING METHOD

EXAMPLE IMAGE DISPLAY

COLOR SPECIFYING POSITION METHOD

EXAMPLE IMAGE DISPLAY

COLOR TRANSITION
SETTING INPUT METHOD

SELECTION WINDOW
DISPLAY EXAMPLE

SETTING WINDOW
DISPLAY EXAMPLE

OPERATION OF IMAGE OUTPUT DEVICE

RANGE SPECIFYING OPERATION

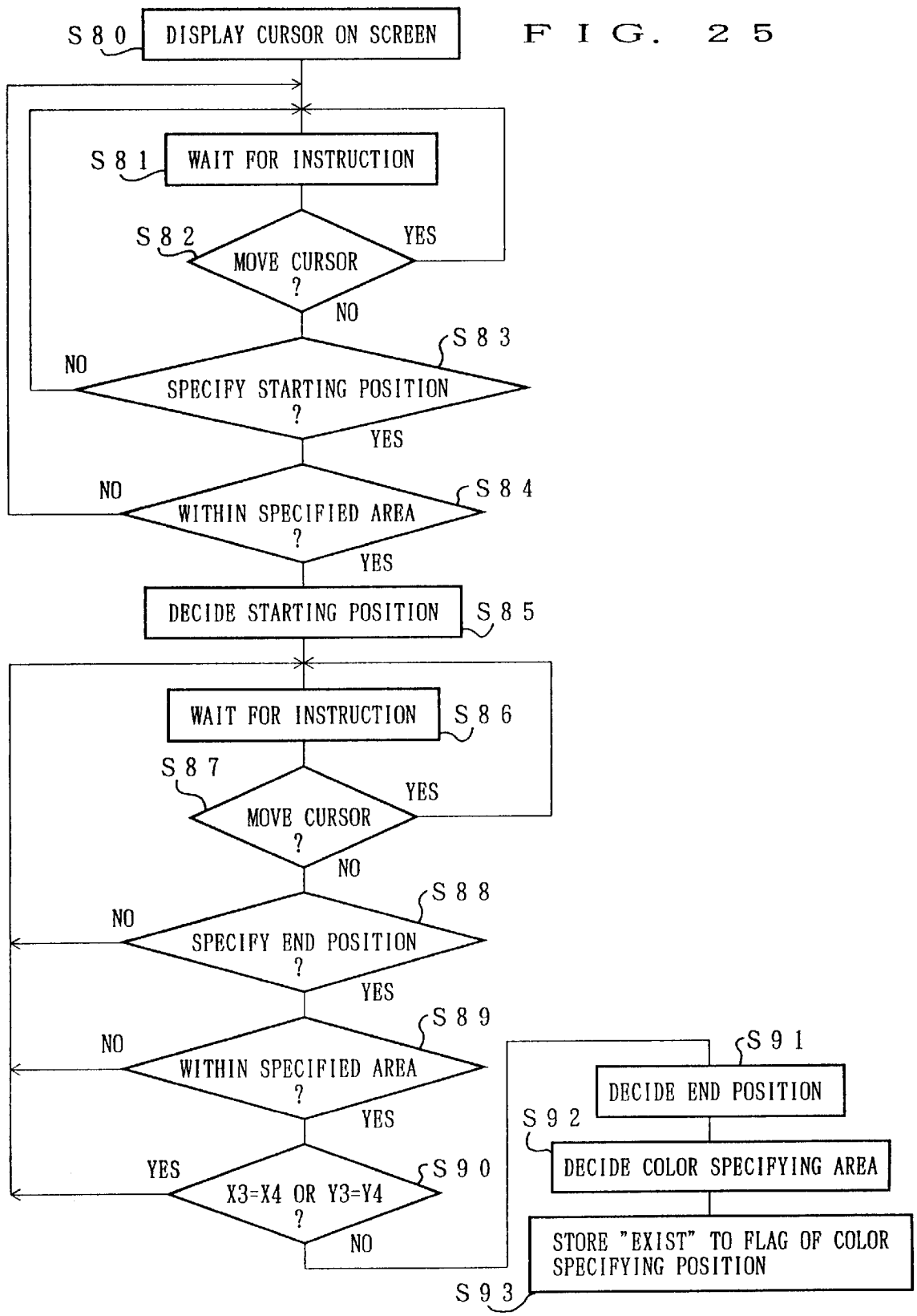
COLOR SPECIFYING POSITION SETTING OPERATION

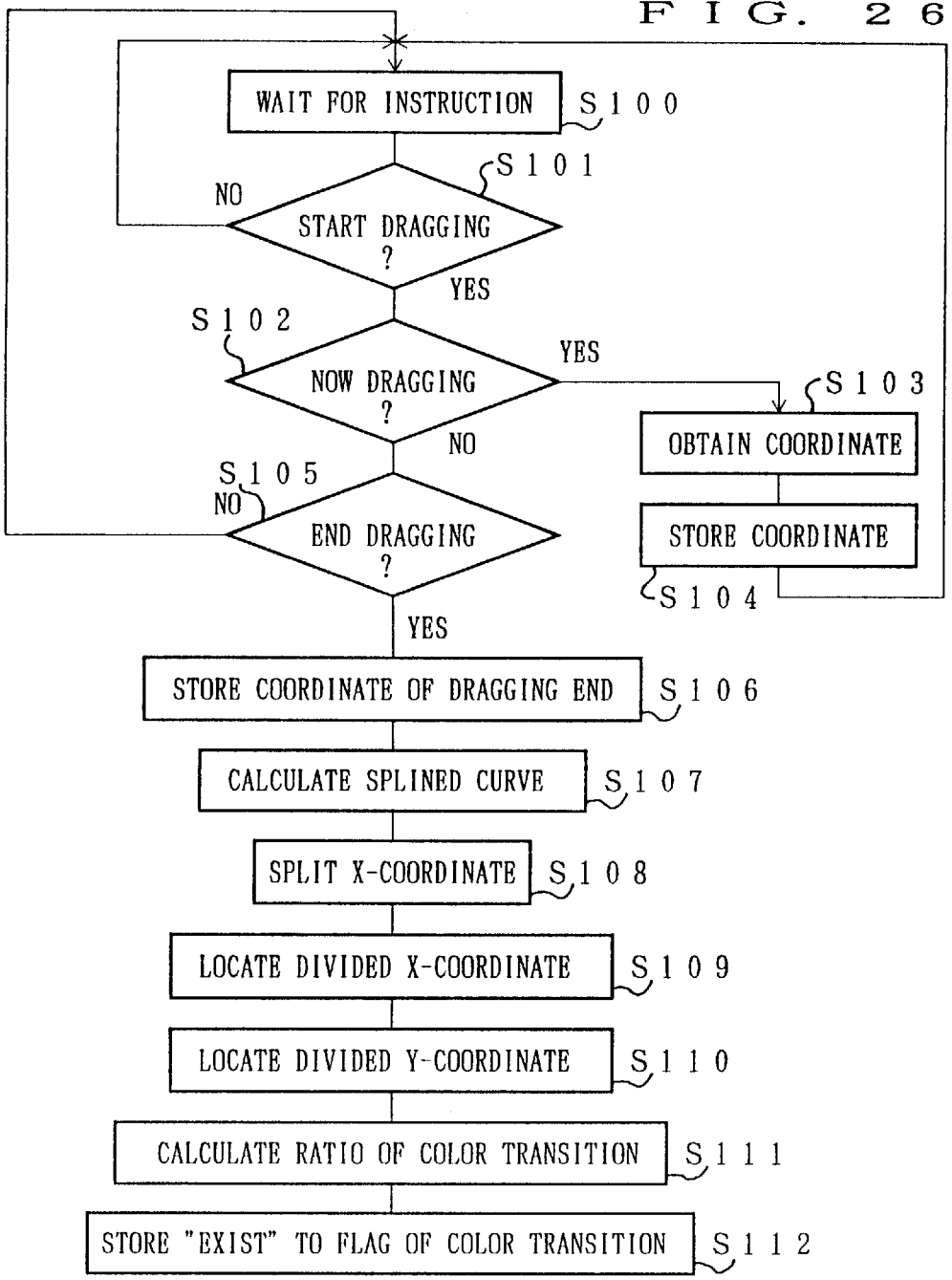
COLOR TRANSITION
SETTING OPERATION

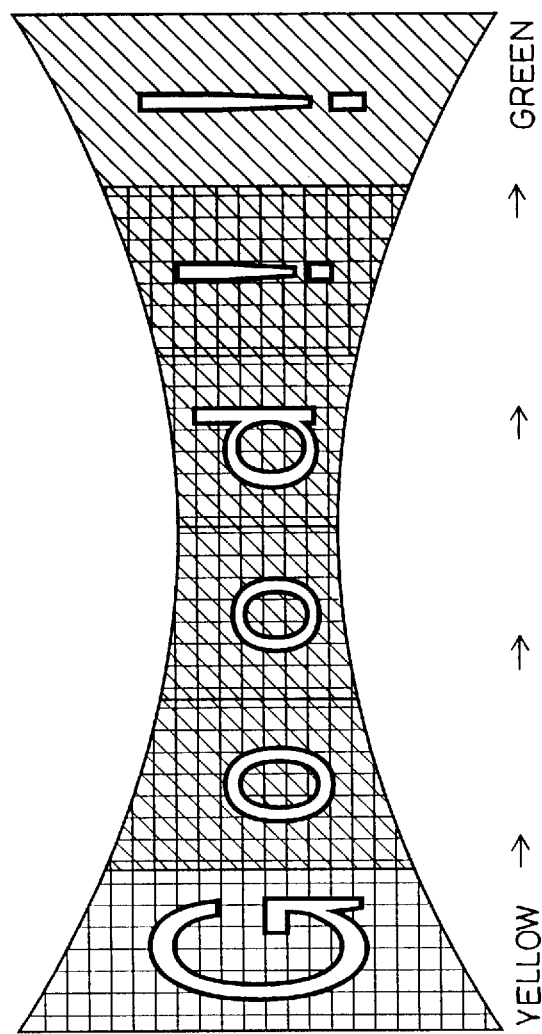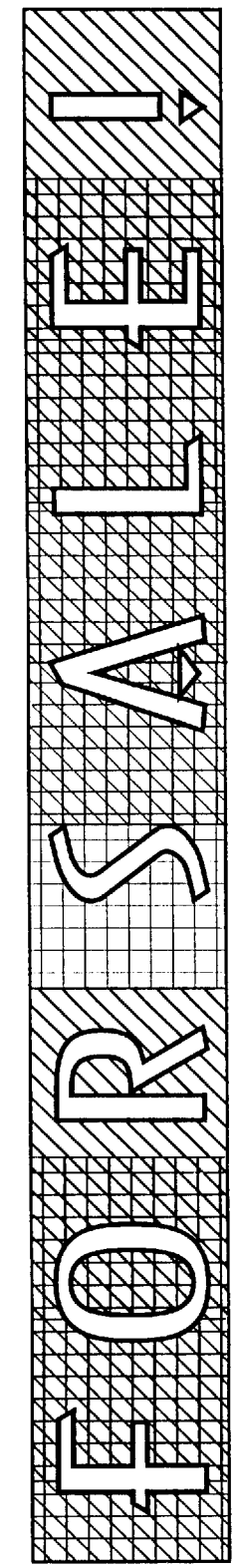
FIG. 27(a)
FIG. 27(b)

EXAMPLE OUTPUT IMAGES

YELLOWISH GREEN → → YELLOW

FIG. 28

| SETTING SCREEN | CANCEL |

| TYPE OF MODIFICATION PATTERN | A B C |
| COLORING TYPE OF CHARACTER | ☐ BLACK |
| COLORING TYPE OF BACKGROUND | ☐ GRADATION (YELLOW → GREEN) |
| TYPE OF SHADOW OF CHARACTER | NONE |
| TYPEFACE | POP |
| CHARACTER SPACING | A  B  C |

END SETTING

A B C

SETTING WINDOW EXAMPLE

WINDOW EXAMPLE

WINDOW EXAMPLE

WINDOW EXAMPLE

CHARACTER SPACING WINDOW

BASIC SCREEN

IMAGE OUTPUT DEVICE

COLOR MIXING AND
COPYING OPERATIONS

DATA FORMATS OF BASIC COLORS

F I G. 3 7

| BASIC COLOR | | DISPLAY COORDINATE | | ADDRESS WHERE COLOR DATA EXIST | FORM OF DISPLAY |
|---|---|---|---|---|---|
| No. | DISPLAY | X | Y | | |
| 1 | YES | ××× | ××× | ××××:×××× | CIRCLE |
| 2 | NO | ××× | ××× | ××××:×××× | TRIANGLE |
| 3 | YES | ××× | ××× | ××××:×××× | ELLIPSE |
| ⋮ | ⋮ | ⋮ | ⋮ | ⋮ | ⋮ |

BASIC COLOR AREA
MANAGING TABLE

COLOR CREATING FUNCTION

CREATING A MIXED COLOR

COLOR MIXING OPERATION

COLOR MIXING OPERATION

BASIC COLOR CHANGING OPERATION

F I G. 4 4

| WORD | PARAMETER |
|---|---|
| WARM | RED: NOT LESS THAN ××% |
| BRIGHT | BRIGHTNESS: NOT LESS THAN ××% |
| SIMILAR | BRIGHTNESS DIFFERENCE BETWEEN THREE PRIMARY COLORS: WITHIN ××% |
| ⋮ | ⋮ |

PARAMETERS OF COLOR IMAGES

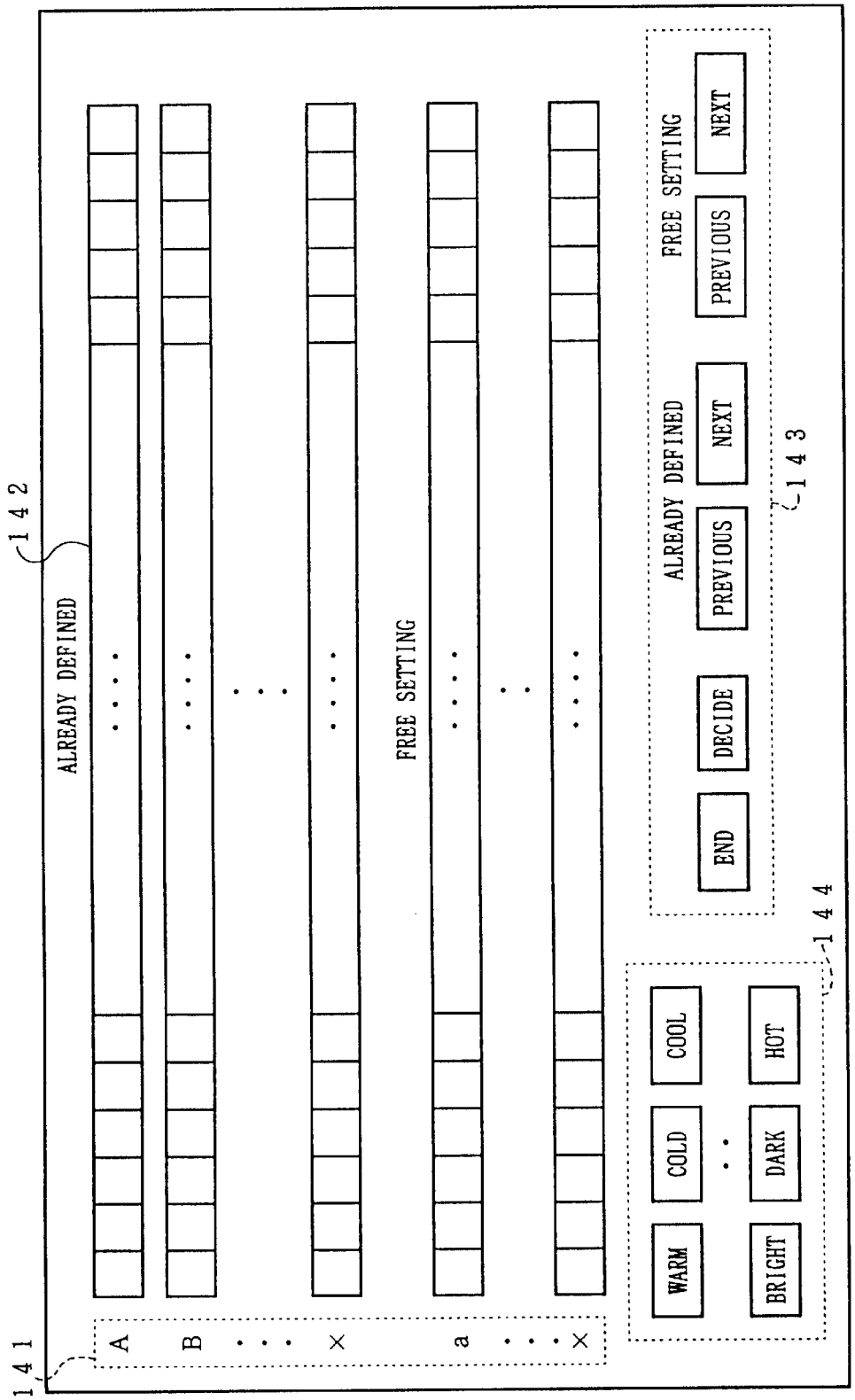

SELECTING SCREEN

COLOR MIXING OPERATION

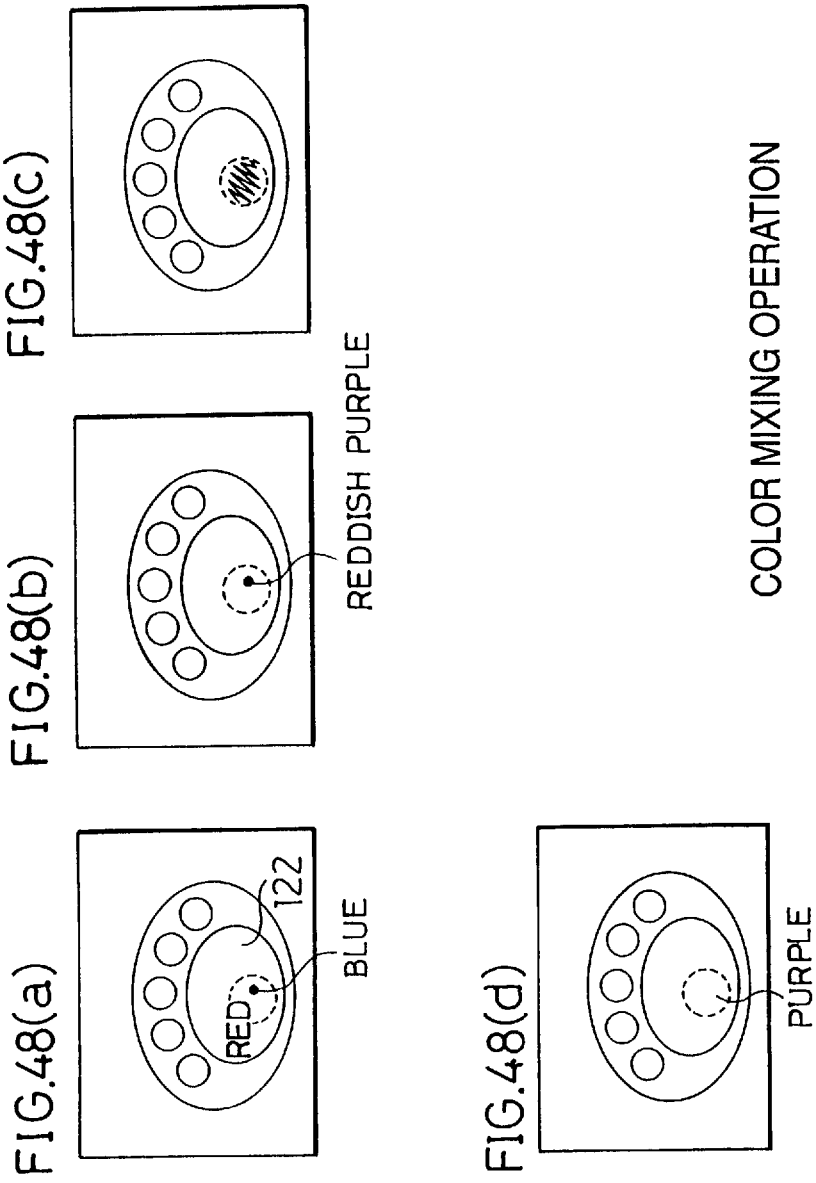

F I G. 4 9

| TOOL FORCE | MULTIPLE OF COLOR MIXING RATIO |
|---|---|
| 0 ~ a | × 1 |
| a ~ b | × 1. 2 |
| b ~ c | × 1. 5 |
| c ~ d | × 1. 7 |
| ⋮ | ⋮ |

COLOR MIXING RATIO

FIG.50(a)
FIG.50(b)
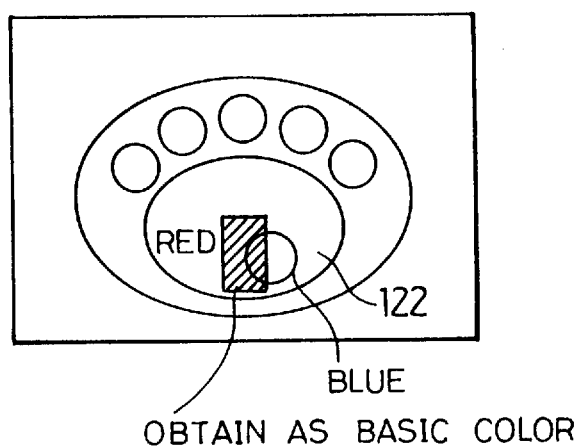
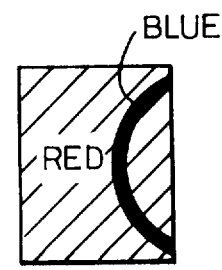
PATTERN CREATION EXAMPLE

COLOR MIXING WITH A PATTERN

MIXING COLORS OF A PATTERN

COLOR MIXING

GESTURE EXAMPLE

BASIC COLORS REPLACING OPERATION

BASIC SCREEN EXAMPLE

TYPEFACE EXAMPLES

IMAGE OUTPUT DEVICE

FIELD OF THE INVENTION

The present invention relates to an image output device which outputs a color image of gradation, rainbow, etc. in a information processing apparatus, such as a personal computer, a word processor and an electronic intellectual toy.

BACKGROUND OF THE INVENTION

Color products are in fashion in the electronics world, and particularly in a display device and a printer, color products have spread. Under such a background, a device which can easily provide various color representation at a low price is desired.

FIG. 28 shows an example of a setting window of a conventional image output device. When "type of modification pattern", for example, is selected on the setting window, a setting window of FIG. 29 appears on a screen. Moreover, "coloring type of character" is selected, a setting window of FIG. 30 appears on the screen, and when "typeface" is selected, a setting window of FIG. 31 appears on the screen. Furthermore, when "character spacing" is selected, a setting window of FIG. 32 appears on the screen.

Therefore, for such outputs of color representation, an operator needs to specify colors of a background and a character, typeface, and a starting color of a gradation or rainbow representation, which is troublesome to the operator to specify a lot of items. Moreover, since colors of a character and a background, a typeface, etc. are specified independently, it requires high technical skill to combine these items based upon a certain image. Therefore, it is difficult to create a desired representation that one imagined.

In order to solve such a problem, Japanese Patent Publication No. 2-113962/1990 (Tokukaihei 2-113962) discloses an image recording device which records an image of a color changing pattern, such as gradation by an operation in a recording device side. In accordance with this arrangement, in the case where data of a relational expression of the color changing pattern are inputted from an external apparatus to a memory of the image recording device, only the data of the relational expression may be inputted to software installed to the external apparatus. However, the image recording device cannot display character data as an image with colors. Moreover, the above Publication does not disclose contents of operations in the image recording device side, so it is impossible to judge easiness of the operation.

Japanese Unexamined Patent Publication No. 4-279980/1992 (Tokukaihei 4-279980) discloses an image editing device which detects operation pressure at the time of inputting a coordinate and controls color information, such as brightness of a color to be used for editing, according to the pressure. In accordance with this arrangement, natural drawing can easily controlled. However, in the above image editing device, since its drawing touch depends upon capabilities of a coordinate input unit, such as a stylus pen, and of a pressure sensor, a very heavy burden on the pressure sensor is required for fine representation, thereby having little practical use.

Japanese Examined Patent Publication No. 56-46082/1981 (Tokukosho 56-46082) discloses a color image scale which adjusts colors using a degree of an image as a standard and arranges the colors in a three-dimensional coordinate so as to position the colors. In accordance with this arrangement, a language can be equivalently converted into color which is imagined from the language. However, the color image scale is useful for application of data, but an image pattern of single color, a color arrangement, a typeface, etc., which is obtained by converting an image from one language, is of only one type. Therefore, a language has only a fixed image, and thus it is impossible to provide the other representation.

A technique for representing characters and illustrations with an intermediate color, multi-colors, etc. is known for various color representation. In order to realize representation with an intermediate color, multi-colors, etc., a method for outputting binary data or a method for outputting multi-valued data is used. The former method obtains target representation by developing each information on unit area using a dither method or an error diffusion method. The latter method develops target representation as a plurality of gradation maps. In the case of color representation, since in both the methods, control can be easily exercised by managing colors on one color table, the color table management is generally adopted to both the methods.

The method for outputting binary data has a problem of color correction, but the method of solving this problem is disclosed in Japanese Unexamined Patent Publication No. 62-198895/1987 (Tokukaisho 62-198895). An intermediate color processing device disclosed in the above Publication is arranged so that a dot pattern corresponding to a display pattern is set and stored in a storage device, and the dot pattern is used according to a color mixing ratio. As a result, the intermediate colored dot pattern without a striped pattern and spots is previously created and registered, thereby making it possible to display an intermediate color which does not have a striped pattern and unevenness on each unit area.

Japanese Unexamined Patent Publication 5-258035/1993 (Tokukaihei 5-258035) discloses an image processing device which is capable of obtaining a desired mixed color when a plurality of colors to be mixed and its mixing ratio are specified in an input section.

As to input means, Japanese Unexamined Patent Publication No. 4-279980/1992 (Tokukaihei 4-279980) discloses a device which controls brightness of color, saturation of color, and hue according to tool force by a stylus pen, etc.

However, in prior arts, since a mixed color is created by using the display method and the input means which are peculiar to the information processing device, a user who is not accustomed to an operation of an electronic device needs advance skills when creating a mixed color. In other words, the prior arts have the following problems.

(1) A special knowledge of color display on an electronic device, such as specifying a color in RGB, is required. Moreover, an operation which is peculiar to an electronic device is required, and this operation is not actually connected to an operation for mixing colors in a picture. For example, when a mixed color is created, a color number should be inputted and a color should be specified from a matrix list. Moreover, in the case where brightness, saturation and hue of a mixed color are changed, a numerical value should be inputted and they should be changed by using a scroll bar.

(2) Since a result is displayed after the setting of color mixing conditions is completed, a lot of numbers of and a lot of time for feedbacks after the result is recognized are required.

(3) The created mixed color and a mixed color, or a mixed color and basic colors cannot be mixed.

(4) A mixed color cannot be created by mixing a pattern, which is color form, with a color.

(5) Since basic colors are displayed on a list or are inputted by a number of sample colors, it is difficult to select the basic colors, so the basic colors cannot be specified by a name of colors, a name of color tones.

(6) The created mixed color cannot be saved. In other words, the created mixed color cannot be called as the basic colors. Moreover, information other than color data cannot be added to the created mixed color and they cannot be saved.

SUMMARY OF THE INVENTION

It is an object of the present invention to provide an image output device which can be operated based upon an image and a sense without special knowledge.

In order to achieve the above object, the image output device of the present invention is characterized by having (1) an input section for inputting a type and an image of a document, (2) a storage section where data, which are types of documents, a word group representing images of documents corresponding to the types and display forms which are imagined from each word in the word group, are previously stored, (3) a converting section for converting the inputted type and image of the document into corresponding display form data by searching the storage section, and (4) a display section for displaying a color image based upon the display form data.

In accordance with the above arrangement, when a user inputs a type of a document, such as a pamphlet and a New Year's card, using the input section, the data in the storage section is searched, and a word group representing an image corresponding to the type of the document, such as "delightful" and "bright", is displayed on the display section. When the word representing the desired image is inputted by selecting it from the word group, the storage section is retrieved so that a display form, such as a color arrangement and a typeface, corresponding to the word is determined.

Therefore, color representation, such as gradation and rainbow, and a typeface of the characters corresponding to the image of the document is automatically created only by inputting the type of the specified document and the word representing the image, and thus an outline representation composed by combining them can be outputted.

As a result, a number of troublesome items to be specified is decreased, thereby making it possible to simplify the operation. Moreover, the operation can be performed by specifying items which do not require special technique and knowledge.

In addition, in order to achieve the above object, the image output device of the present invention is characterized by having (1) an input section for specifying colors, (2) a processing section for creating a mixed color by mixing a plurality of colors according to data from the input section, (3) a storage section for previously storing data of basic colors and for storing the data from the input section and data of the created mixed color, and (4) a display section for outputting a display screen where a basic color display area, in which a plurality of basic colors are displayed according to the data stored in the storage section, and a color mixing area, which has a plurality of areas where a plurality of colors specified by the input section are mixed and in which the created mixed color is displayed according to the data stored in the storage section, are positioned.

In accordance with the above arrangement, the display screen is shown in the display section. Since the basic color display area, on which a plurality of basic colors are displayed, is positioned on the display screen, the basic colors can be specified by the input section, such as a pen and a mouse. When two colors are selected as the basic colors, for example, and the two colors are specified on the same portion of the color mixing area, a mixed color obtained by mixing the two colors is displayed in the color mixing area.

Therefore, a mixed color can be created on the screen while changes in brightness, saturation of colors to be mixed and a mixed color are being observed. AS a result, a mixed color can be created based upon the user's sense. Moreover, in the case where basic colors are specified, colors themselves can be selected by specification unlike a conventional device in which colors are specified by inputting the number of colors, so the operational environment becomes more natural, and even a beginner can easily perform the operation. Moreover, since the operation can be performed in a plurality of portions in the color mixing area, mixed colors can be created simultaneously in a plurality of portions. Therefore, it is possible to obtain a desired mixed color by creating the mixed color comparing a plurality of mixed colors with one another.

For fuller understanding of the nature and advantages of the invention, reference should be made to the ensuing detailed description taken in conjunction with the accompanying drawings.

BRIEF DESCRIPTION OF THE DRAWINGS

FIG. 3 is an explanatory drawing which shows a type table for displaying a selection window of type of documents.

FIG. 4 is an explanatory drawing which shows an example of display of the selection window.

FIG. 5 is an explanatory drawing which shows an image table for displaying a selection window of an image of documents.

FIG. 8 is an explanatory drawing which shows an image conversion table for converting a character string of the image of documents, which is freely inputted by an user, into an image existing on the image table.

FIG. 9 is an explanatory drawing which shows an image color arrangement conversion table for deriving a color arrangement, etc. from the selected image of a document.

FIG. 10 is an explanatory drawing which shows a rainbow color arrangement table for deriving a rainbow color arrangement from a rainbow number.

FIG. 11 is an explanatory drawing which shows an input window of a character string in the case where free input is selected.

FIG. 12 is an explanatory drawing which shows a window for previously setting the rainbow arrangement.

FIG. 25 is a flow chart which shows a color specifying position setting operation of the image output device.

FIG. 26 is a flow chart which shows a color transition setting operation of the image output device.

FIG. 27(a) is an explanatory drawing which shows an example of an output image from the image output device when the gradation is selected.

FIG. 27(b) is an explanatory drawing which shows an example of an output image when the gradation is repeated.

FIG. 28 is an explanatory drawing which shows an example of a setting window of a conventional image output device.

FIG. 37 is an explanatory drawing which shows a table for managing a basic color area.

FIG. 44 is an explanatory drawing which shows parameters of color images.

FIG. 45 is an explanatory drawing which shows a selecting screen in the case where basic colors are changed.

FIG. 48(a) is an explanatory drawing which shows a method for changing a color mixing ratio by specifying only one portion of the color mixing area.

FIG. 48(b) is an explanatory drawing which shows an operation result of FIG. 48(a).

FIG. 48(c) is an explanatory drawing which shows a method for changing the color mixing ratio by moving a cursor through a wide range of the color mixing area.

FIG. 48(d) is an explanatory drawing which shows an operation result of FIG. 48(c).

FIG. 49 is an explanatory drawing which shows a change in the color mixing ratio by pressing with a pen.

FIG. 50(a) is an explanatory drawing which shows an example of pattern creation.

FIG. 50(b) is an enlarged drawing of FIG. 50(a).

FIG. 57(a) is an explanatory drawing which shows an example of a typeface "POP".

FIG. 57(b) is an explanatory drawing which shows an example of a typeface "EDOMOJI".

FIG. 57(c) is an explanatory drawing which shows an example of a typeface "MINCHOTAI".

DETAILED DESCRIPTION OF THE PREFERRED EMBODIMENTS

EMBODIMENT 1

The following describes one embodiment of the present invention on referring to FIGS. 1 through 27. An image output device of the present embodiment is provided to an information processing apparatus, such as Japanese word processors which require an input operation by a keyboard.

Figure 2:
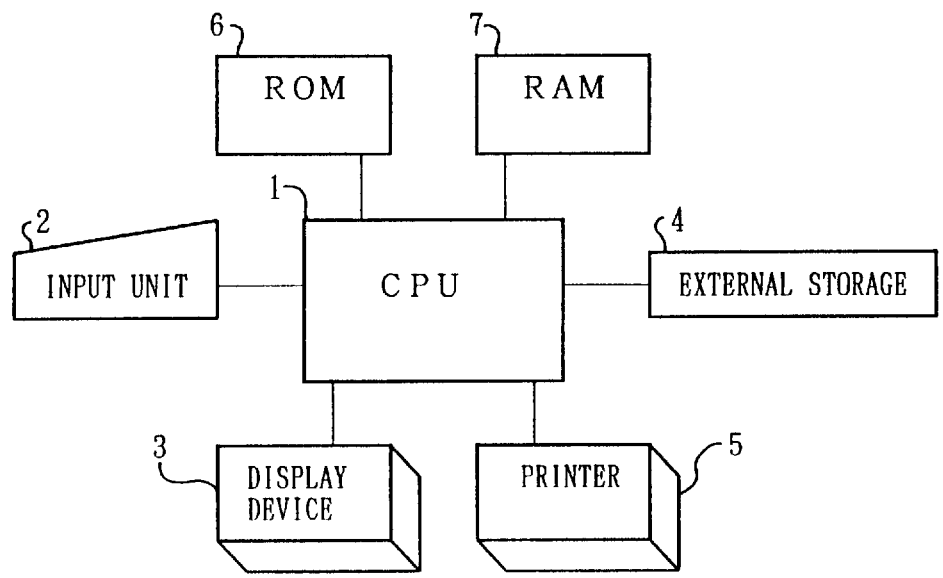
FIG. 2 is a block diagram which shows an arrangement of the image output device.

As shown in FIG. 2, the image output device has a central processing unit (ie. CPU) 1, an input unit 2, a display device 3, an external storage 4, a printer 5, a ROM 6 and a RAM 7.

The CPU (converting means) 1 executes a program. The input unit (input means) 2 is composed of a keyboard, a pen, a mouse, etc., and it inputs characters and various instructions. The display device (display means) 3 is composed of a CRT or liquid crystal, and it displays an image, which was processed by the CPU 1. The external storage (storage means) 4 is a floppy disk, etc., and it contains data. The printer 5 prints an image, which was processed by the CPU 1. The ROM (storage means) 6 contains programs and fixed data for creating and editing of documents, and various applications. The RAM (storage means) 7 contains various data.

Figure 1:
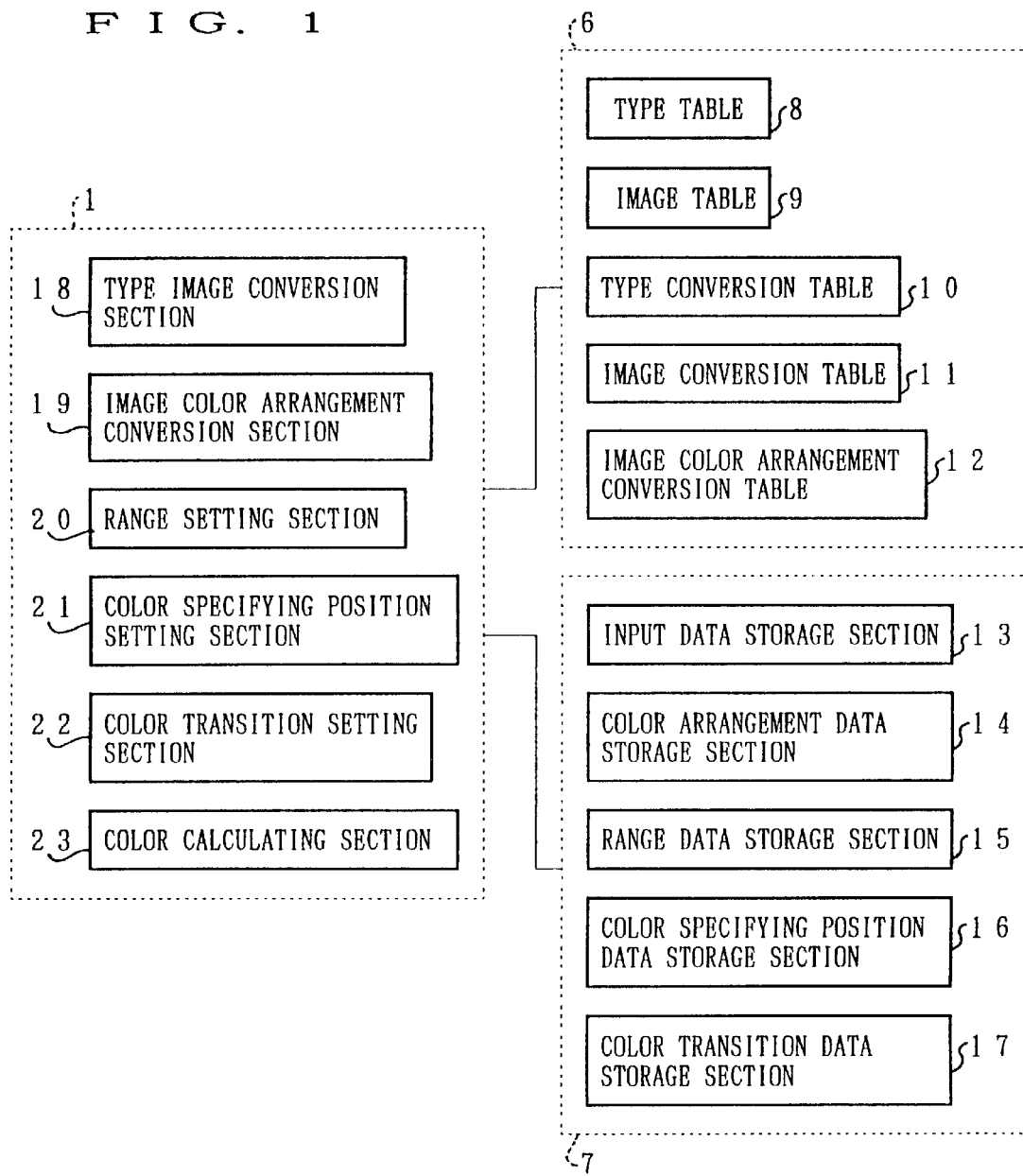
FIG. 1 is a block diagram which shows an arrangement of main elements of an image output device according to one embodiment of the present invention.

The following describes main components of the present invention on referring to FIG. 1.

The ROM 6 is provided with a type table 8, an image table 9, a type conversion table 10, an image conversion table 11, and an image color arrangement conversion table 12.

An example of the type table 8 is shown in FIG. 3. This previously contains types of documents. FIG. 4 shows a selection window displaying types of documents based upon data of the type table 8.

Figure 6:
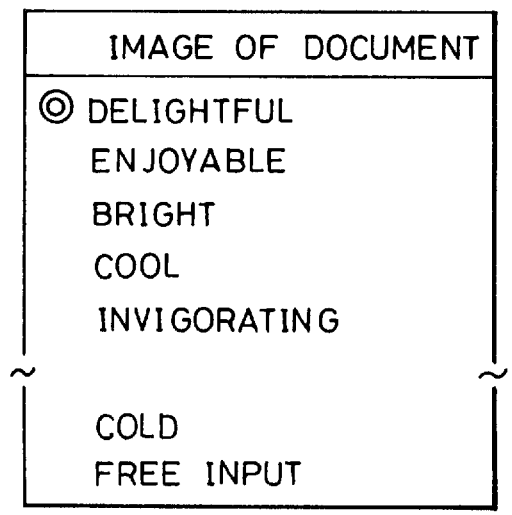
FIG. 6 is an explanatory drawing which shows an example of display of the selection window.

An example of the image table 9 is shown in FIG. 5. This is for deriving an image, which is suitable to a document from the types of the documents. In other words, the image table 9 previously contains a group of words representing images respectively according to the types of the documents. FIG. 6 shows a selection window displaying words corresponding to the images of the documents based upon the data of the image table 9.

Figure 7:
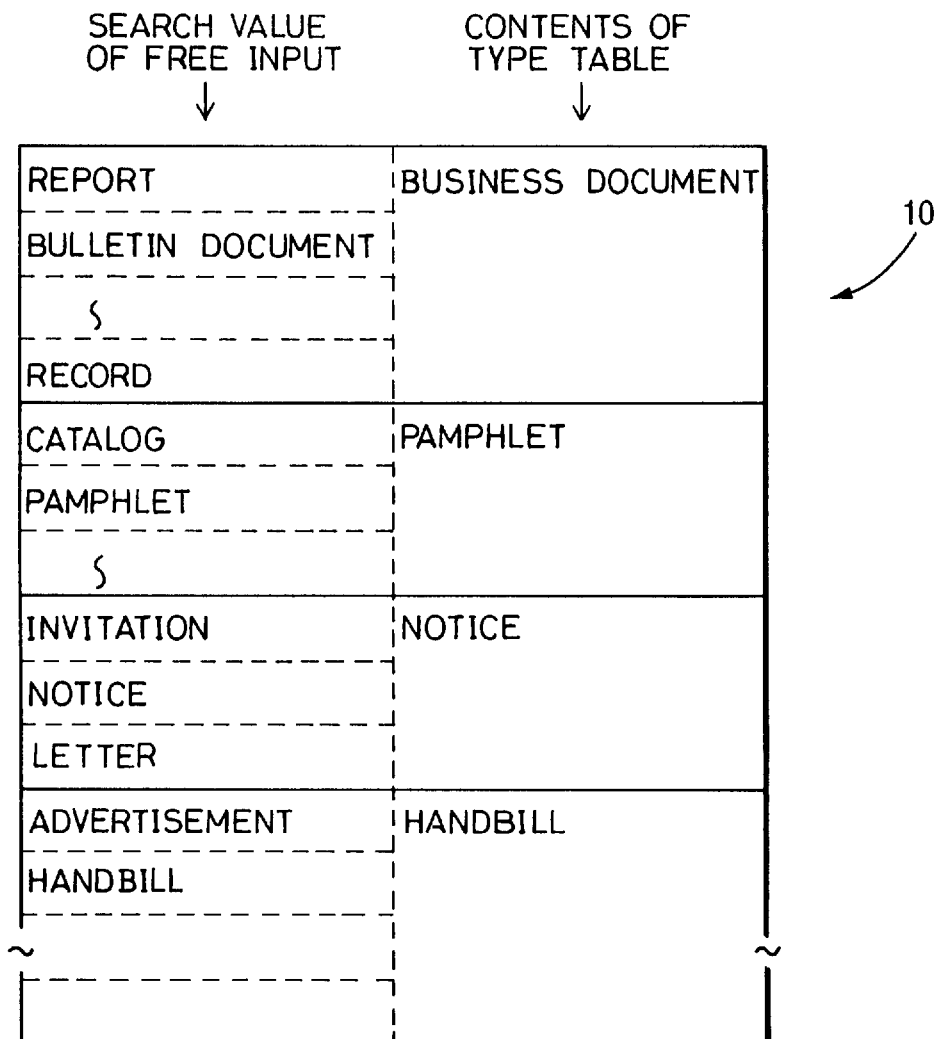
FIG. 7 is an explanatory drawing which shows a type conversion table for converting a character string of the type of documents, which is freely inputted by an operator, into a type existing on the type table.
Figure 13:
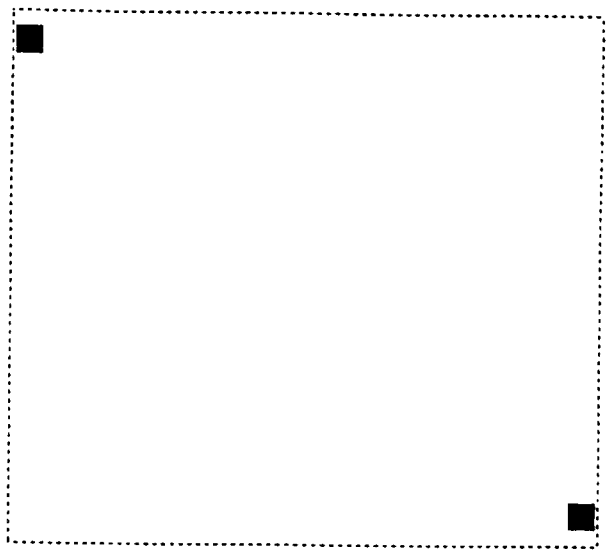
FIG. 13 is an explanatory drawing which shows a range specifying method for a gradation/rainbow area.

An example of the type conversion table 10 is shown in FIG. 7. This is a table for converting a character string into the data on the type table 8 in the case where a user selects free input on the selection window in FIG. 4 and inputs a type of the documents as the character string on the input window in FIG. 11.

An example of the image conversion table 11 is shown in FIG. 8. This is a table for converting a character string into the data on the image table 9 in the case where a user selects free input on the selection window in FIG. 6 and inputs an image of the document as the character string on the input window in FIG. 11.

As shown in FIG. 9, for example, the image color arrangement conversion table 12 contains color arrangements according to the images of each document. In other words, it contains display state data, such as a start color, an end color, a typeface, a rainbow number and a pattern number according to the image of the document.

Here, the start color is a starting color of a pattern whose brightness of color, saturation of color, or hue is continuously changed (ie. gradation). The end color is an ending color of the gradation. Moreover, the character color is a color of the inside of characters. The rainbow number and the pattern number are numbers which are given for convenience. Here, the rainbow is a color band group. Examples of typefaces "POP", "EDOMOJI" and "MINCHOTAI" of FIG. 9 are shown in FIGS. 57(a), 57(b) and 57(c).

In addition, as shown in FIG. 1, the RAM 7 is provided with an input data storage section 13, a color arrangement data storage section 14, a range data storage section 15, a color specifying position data storage section 16, and a color transition data storage section 17.

The input data storage section 13 stores information of a type of a document to be selected by a user and a type of a document, freely input by a user. Moreover, it stores information of an image of a document selected by a user and a image of a document freely input by a user.

The color arrangement data storage section 14 stores a start color, an end color, a character color, a typeface, a rainbow number and a pattern number which was derived from the image color arrangement conversion table 12. Moreover, it stores a number of splits showing how many the color of the gradation/rainbow is divided into within its area. At this time, a number of splits is represented by "n".

The color arrangement data storage section 14 has a rainbow color arrangement table. As shown in FIG. 10, for example, the rainbow color arrangement table is a table for deriving a target rainbow color arrangement from the rainbow numbers. Fixed data are not stored in the table of the rainbow No. "0" so that a user can freely set a color arrangement. Moreover, brightness is an index which represents brightness of a color by 00–FFH. 00 means low brightness and FF means high brightness. Moreover, the color arrangement data storage section 14 is provided with a color buffer, the color buffer successively stores output colors of the gradation/rainbow.

The range data storage section 15 stores X and Y coordinates of a start point (start position) and X and Y coordinates of an end point (end position) of the gradation/rainbow.

The color specifying position data storage section 16 stores X and Y coordinates of a color specifying start point and X and Y coordinates of a color specifying end point for specifying a color position within the specified area of the gradation/rainbow. Moreover, the color specifying position data storage section 16 has a color specifying position flag which shows whether a color position is specified or not.

The color transition data storage section 17 has a locus buffer, and the locus buffer successively stores coordinates of waveform of a locus drawn for calculating transition of colors. Moreover, the color transition data storage section 17 stores an end coordinate of the waveform of the locus.

Further, the color transition data storage section 17 stores a split X coordinate, which is obtained by dividing the end coordinate by a number of splits, and a split Y coordinate, which is obtained from the split X coordinate and a splined curve, mentioned later. The color transition data storage section 17 stores intervals and a changing amount of the X coordinate and the Y coordinate. Moreover, the color transition data storage section 17 has a color transition flag which shows whether color transition (changing amount) is set.

In addition, as shown in FIG. 1, the CPU 1 is provided with a type image conversion section 18, an image color arrangement conversion section 19, a range setting section 20, a color specifying position setting section 21, a color transition setting section 22 and a color calculating section 23.

The type image conversion section 18 converts a type selected from the type table 8 into an image word group according to the selected type referring to the image table 9.

The image color arrangement conversion section 19 converts a document image selected by the input unit 2 into a desired start color, end color, character color, typeface, rainbow number and pattern (outline) of gradation/rainbow, referring to the image color arrangement table 12, and determines them. The range setting section 20 specifies an area for drawing with gradation/rainbow by setting a start point and an end point.

The color specifying position setting section 21 determines a range of the gradation/rainbow within the set area by setting a color specifying start point and a color specifying end point. As a result, a portion of the area can be colored with gradation or rainbow.

Figure 17:
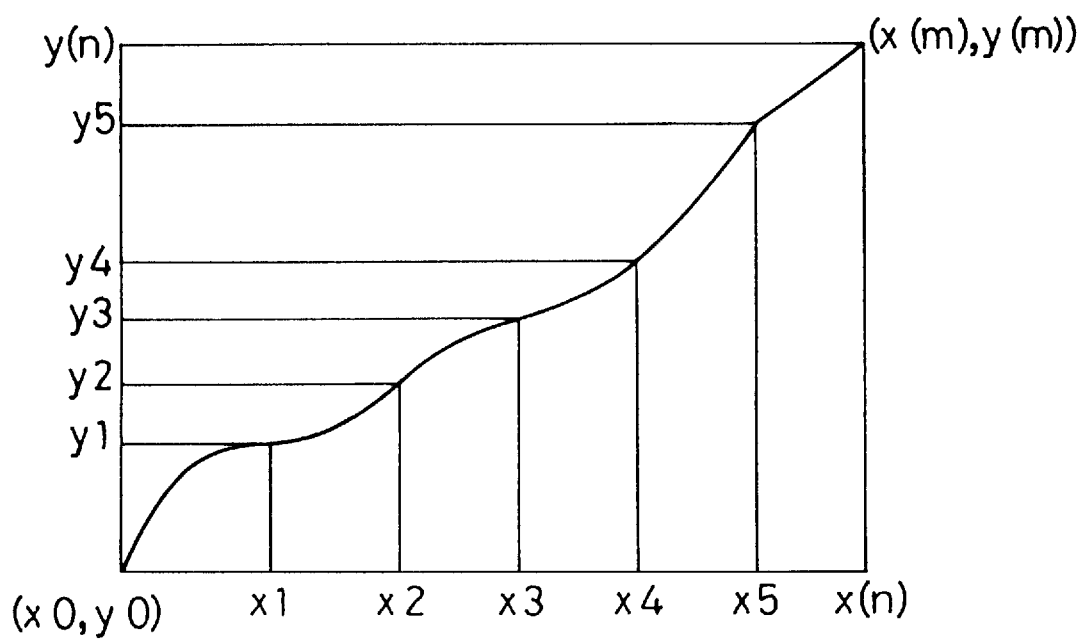
FIG. 17 is an explanatory drawing which shows an input method for gradation/rainbow color transition setting.

The color transition setting section 22 sets color transition (changing amount) of the gradation or rainbow. As shown in FIG. 17, for example, when a length of the area in the direction where colors do not change is used to enter the vertical axis, the start color (point) and the end color (point) are used to enter the horizontal axis, and a locus is drawn as shown in the drawing, the color transition can be set.

The color calculating section 23 calculates a color between the start colors and the end color of the gradation from the number of splits.

The following describes the operation of the image output device referring to the flow charts shown in FIGS. 20 through 26.

Figure 20:
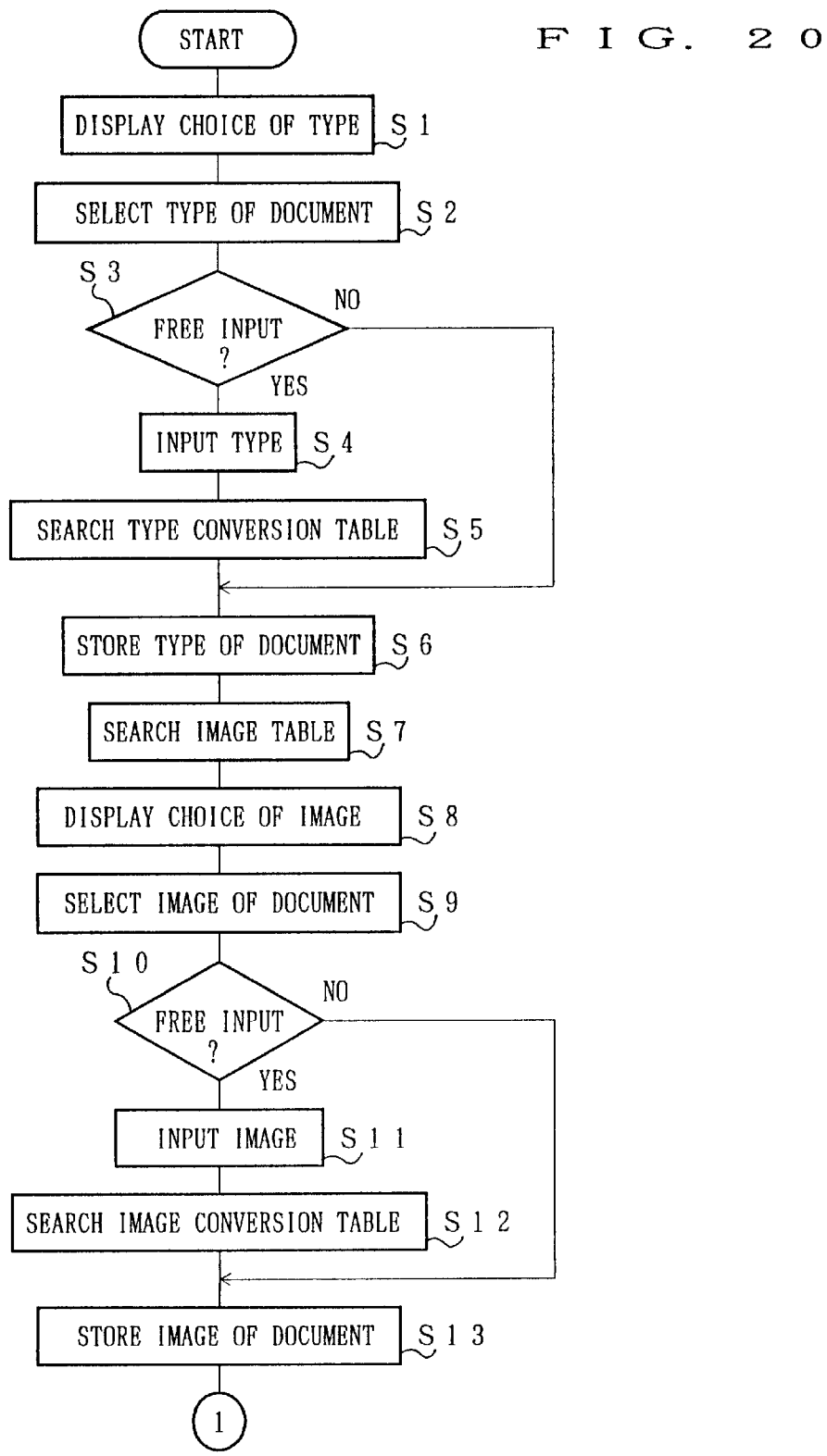
FIG. 20 is a flow chart which shows an operation of the image output device.

First, as shown in FIG. 20, referring to the type table 8, the types of documents are displayed on the selection window (S1). A type of document to be created is selected and input by a user (S2). At this time, a judgement is made as to whether the input result is free input, namely, whether the type is selected from a choice of the types previously set in the window by the user (S3). In the case where the judgement is made that the input is free input at S3, a character string is freely input by the user, and its output result is stored in the input data storage section 13 (S4). The type conversion table 10 is retrieved according to the stored character string data (S5), and the character string is converted into a type of the corresponding document. This output result is stored in the input data storage section 13 (S6). Meanwhile, in the case of selection input at S3, the sequence does not go to S4 and S5, and the selected type is stored in the input data storage section 13 (S6).

Next, the image table 9 is retrieved based upon the document type stored in the input data storage section 13 (S7), and images of the document corresponding to the document type are displayed on the selection window (S8). An image of the document to be created by the user is selected and inputted (S9). At this time, the judgement is made as to whether the input result is free input, namely, the image is selected from a choice of images previously set in the window by the user (S10).

In the case of the free input at S10, a character string is freely input by the user, and its output result is stored in the input data storage section 13 (S11). The image conversion table 11 is retrieved based upon the stored character string data (S12), and the character string is converted into a corresponding document image. This output result is stored in the input data storage section 13 (S13). Meanwhile, in the case of the section input at S10, the sequence does not go to S11 and S12, the selected image is stored in the input data storage section 13 (S13). The document image can be selected according to the types of documents by the above process.

Figure 21:
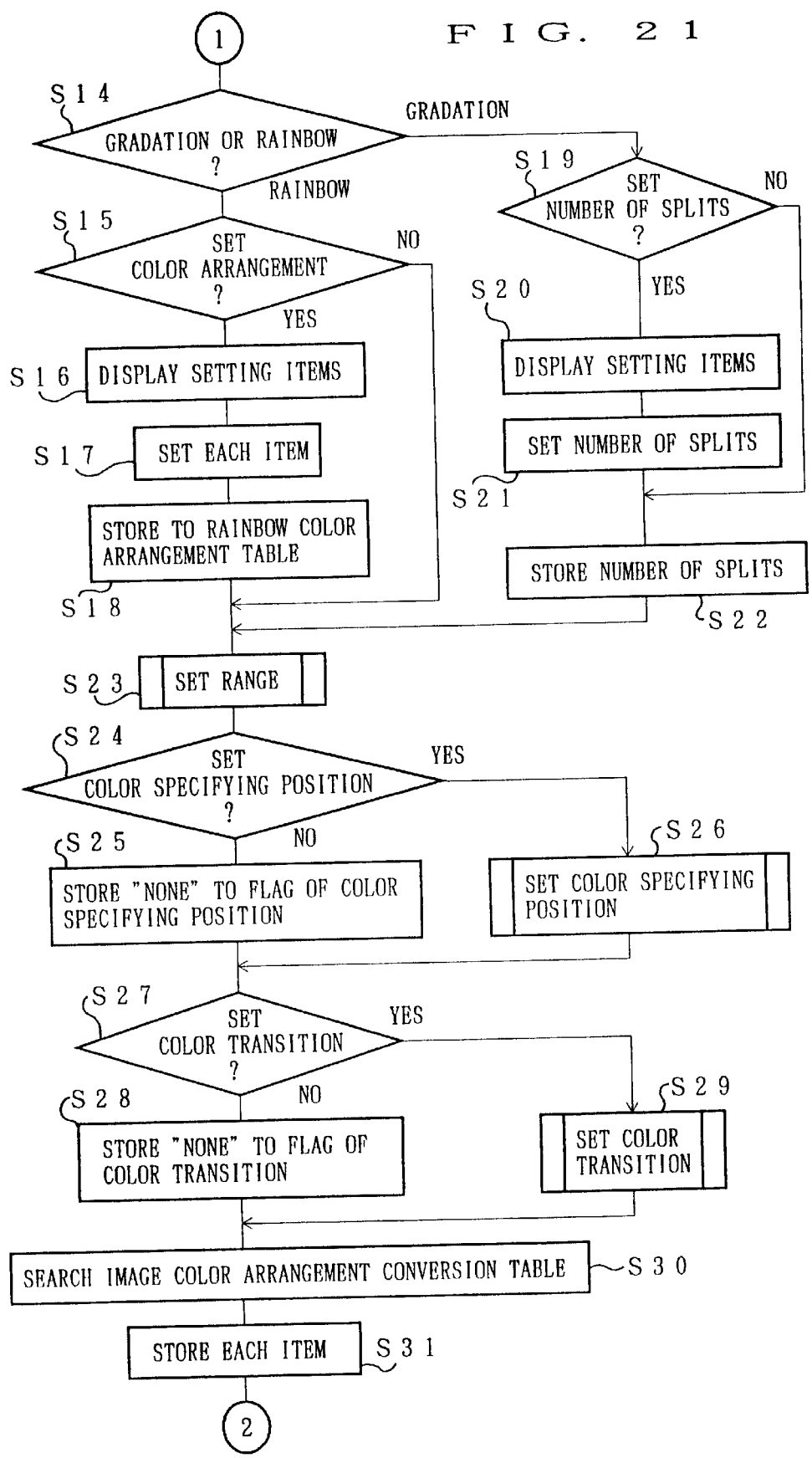
FIG. 21 is a flow chart following FIG. 20.

Next, as shown in FIG. 21, a judgement is made as to gradation or rainbow (S14). In the case of the rainbow at S14, a judgement is made as to whether a color arrangement is set (S15). When the judgement is made that the color arrangement is set at S15, as shown in FIG. 12, the setting window showing items, such as a order of colors, brightness and a number of splits, is displayed (S16). Then, the user inputs information into each item and sets a color arrangement of the rainbow (S17). The set data is stored in the first table (rainbow No. "0") of the rainbow color arrangement table (S18). Meanwhile, when the color arrangement has been already set or setting of the color arrangement is not necessary at S15, the sequence does not go to the steps S16 through S18 but to the step S23.

Figure 19:
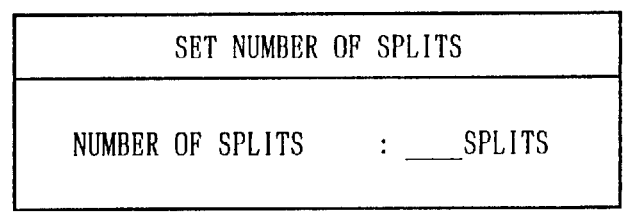
FIG. 19 is an explanatory drawing which shows a display example of a setting window of a number of splits.

In the case of the gradation at S14, a judgement is made as to whether a number of splits is set (S19). When the judgement is made that a number of splits is set at S19, as shown in FIG. 19, the setting window showing items of a number of splits is displayed (S20). Then, a number of splits is set by the user (S21). The set value is stored in the color arrangement data storage section 14 (S22). Meanwhile, when a number of splits has been already set or the setting of a number of splits is not necessary at S19, the sequence does not go to S20 and S21 but to S22, and a default value is stored in the color arrangement data storage section 14. As a result, the color arrangement, a number of splits, etc. are set as to the respective gradation and rainbow.

Next, a range where the gradation/rainbow process is carried out is specified (S23). The step S23 is described on referring to the flow chart of FIG. 24 and FIG. 13. First, a cursor is displayed on a screen (S60). The device waits for an instruction by the user (S61), and a judgement is made as to whether the cursor is moved (S62). When the cursor is moved, the device again waits for an instruction by the user (S61). When the cursor is not moved at S62, a judgement is made as to whether a start position of the gradation/rainbow is specified (S63). When the judgement is made that the start position is not specified, the device again waits for an instruction by the user (S61). In the case where the start position is specified at S63, the position is determined as a start point A (X1, Y1), and it is stored in the range data storage section 15 (S64).

Next, an end point B (X2, Y2), which is a position where the gradation/rainbow ends, is determined by a similar procedure. In other words, the device waits for an instruction by the user (S65), and the judgement is made as to whether the cursor is moved (S66). When the judgement is made that the cursor is moved, the device again waits for an instruction by the user (S65). When the cursor is not moved at S66, a judgement is made as to whether the end position of the gradation/rainbow is specified (S67). When the end position is not specified, the device again waits for an instruction by the user (S65). When the end position is specified at S67, a judgement is made as to whether the relationship "X1=X2 or Y1=Y2" is satisfied (S68). When the above relationship is satisfied at S68, the device again waits for an instruction by the user (S65). In the case where the above relationship is not satisfied, the end point B (X2, Y2) is determined, and it is stored in the range data storage section 15 (S69). Since the above area has a rectangular shape, the relationship becomes as follows:

X1≠X2; and

Y1≠Y2.

Figure 14:
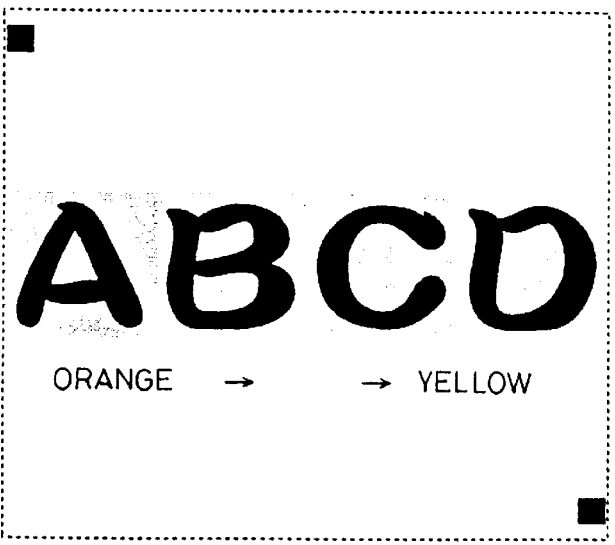
FIG. 14 is an explanatory drawing which shows an example of an image displayed by the range specifying method.
Figure 15:
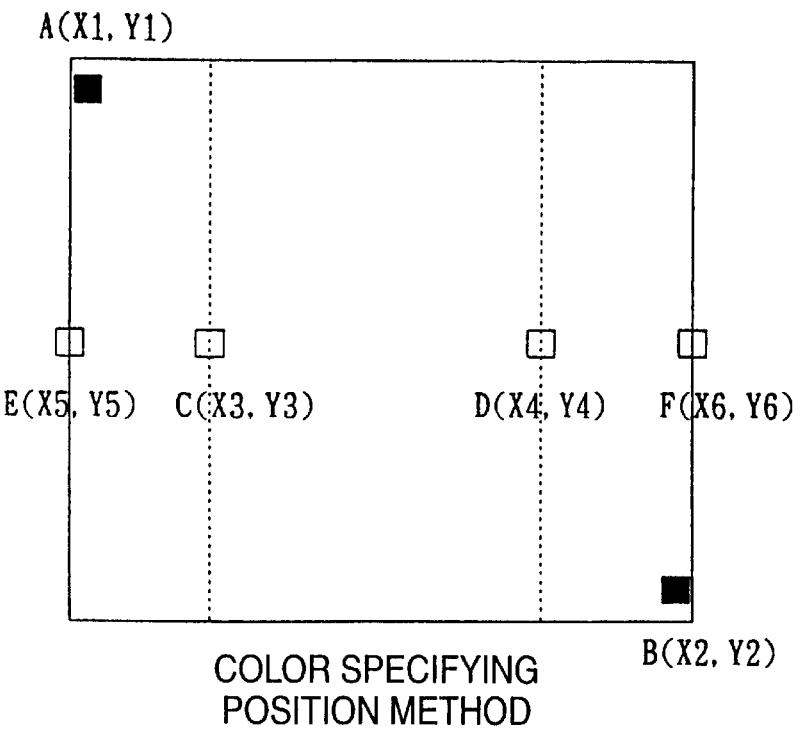
FIG. 15 is an explanatory drawing which shows a method for setting a color specifying position of gradation/rainbow.

As a result, a rectangular area represented by the start point A and the end point B is determined (S70). The area is shown by putting a dotted line around it on the screen. FIG. 14 shows an example of the case where the range is actually set.

As a result, as shown in FIG. 21, the range of the gradation/rainbow is set (S23), and then a judgement is made as to whether a color specifying position is set (S24). When the color specifying position is not set at S24, "NONE" is stored to the color specifying position flag (S25). When the color specifying position is set, the color specifying position is set (S26). The step S26 is described referring to the flow chart of FIG. 25 and FIG. 15. This step is basically same as step S23 for setting the range.

In other words, first, the cursor is displayed on the screen (S80). The device waits for an instruction by the user (S81), and a judgement is made as to whether the cursor is moved (S82). The cursor is moved, the device again waits for an instruction by the user (S81). When the cursor is not moved at S82, a judgement is made as to whether a start position of the gradation/rainbow is specified (S83). When the start position is not specified, the device again waits for an instruction by the user (S81). When the start position is specified at S83, a check is made as to whether the start position is within the range set at S23 (S84). When the start position is within the range, the position is determined as a color specifying start point C (X3, Y3) (S85). When the start position is not within the range at S84, the device again waits for an instruction by the user (S81).

Next, a color specifying end point D (X4, Y4), which is an end position of the gradation/rainbow, is determined by a similar procedure. In other words, the device waits for an instruction by the user (S86), and the judgement is made as to whether the cursor is moved (S87). When the cursor is moved, the device again waits for an instruction by the user (S86). When the cursor is not moved at S87, a judgement is made as to whether the end position of the gradation/rainbow is specified (S88). When the end position is not specified, the device again waits for an instruction by the user (S86).

Meanwhile, when the end position is specified at S88, a check is made as to whether the end position is within the range set at S23 (S89). When the end position is within the range, a judgement is made as to whether the relationship "X3=X4 or Y3=Y4" is satisfied (S90). When the above relationship is satisfied at S90, the device again waits for an instruction by the user (S86). When the above relationship is not satisfied at S90, the color specifying end point D (X4, Y4) is determined (S91). Since the above area has a rectangular shape, the relationship becomes as follows:

X3≠X4; and

Y3≠Y4.

As a result, the rectangular area represented by the color specifying start point C and the color specifying end point D is determined (S92). Then, the above coordinate is stored in the color specifying position data storage section 16, and "EXIST" is stored in the color specifying position flag (S93).

When the color specifying position is set by the above process, the first color of the gradation/rainbow is arranged on the color specifying start point C, and the final color is arranged on the color specifying end point D. In other words, the colors between the color specifying start point C and the color specifying end point D are arranged so as to be changed by gradation from the first color (start color) to the final color (end color), and in the case of the rainbow, colors shown on the rainbow color arrangement table are used.

Figure 16:
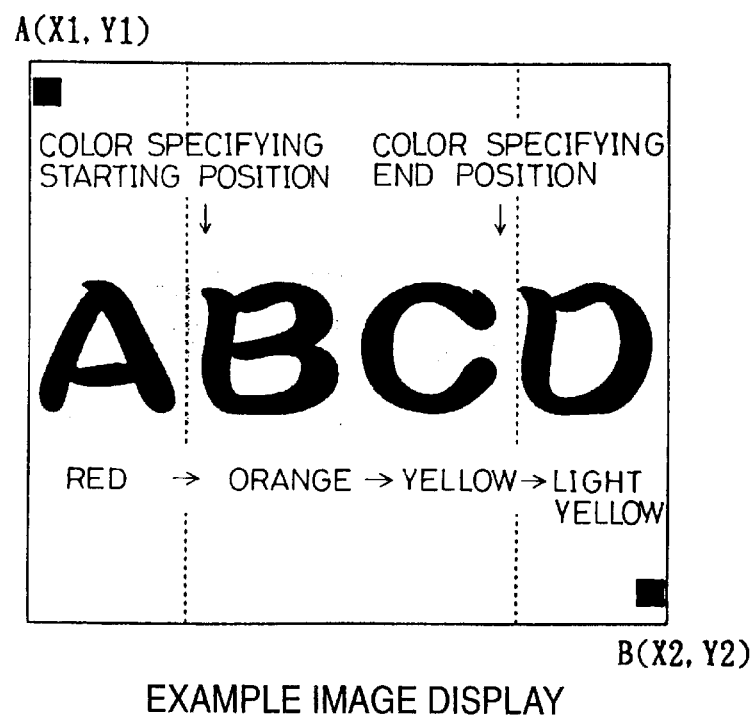
FIG. 16 is an explanatory drawing which shows an example of an image displayed by the above method.

In addition, in the gradation, colors, which are estimated based upon the gradation in the D→C direction, are used in an area from the color specifying start point C to an end of an outer domain E (X5, Y5), and colors, which are estimated based upon the gradation in the C→D direction, are used in an area from the color specifying end point D to an end of an outer domain F (X6, Y6). FIG. 16 shows an example of the case where the range is set by gradation. Meanwhile, in the rainbow, the color at the color specifying start point C is arranged in the domain from the color specifying start point C to the end of the outer domain E (X5, Y5), and the color at the color specifying end point D is arranged in the domain from the color specifying end point D to the end of the outer domain F (X6, Y6).

As shown in FIG. 21, after the process of S25 or S26, a judgement is made as to whether color transition is set (S27). When the judgement is made that the color transition is not set at S27, "NONE" is stored in the color transition flag (S28), and when the judgement is made that the color transition is set at S27, the color transition is set (S29). The process of S29 is described referring to the flow chart in FIG. 26 and FIG. 17.

First, the device waits for an instruction by the user (S100), and a judgement is made as to whether a locus starts to be drawn (S101). At this time, the origin of the locus is at the lower left of a domain to be colored by gradation/rainbow, and it is represented by (x0, y0). Here, x0=0 and y0=0. When the judgement is made that the locus is not started at S101, the device again waits for an instruction by the user (S100), and when the locus is started, a judgement is made as to whether dragging is currently being carried out (S102). When the judgement is made that the dragging is currently being carried out at S102, its coordinates are obtained (S103), and the drawn coordinates are successively stored in the locus buffer (S104). Then the device again waits for an instruction by the user (S100).

Meanwhile, when the judgement is made that the dragging is not current being carried out at S102, a judgement is made as to whether the locus is ended (S105), and when the locus is not ended, the device again waits for an instruction by the user (S100). When the judgement is made that the locus is ended at S105, an end point of the locus is stored in the locus buffer (S106). At this time, the end point is at the upper right of the region to be colored by the gradation/rainbow, and it is represented by (x(m), y(m)).

Thereafter, a formula of a splined curve mentioned below is calculated (S107) based upon the coordinate data stored in the locus buffer. Here, a method, for calculating a formula of such a curve based upon the coordinate data, is known.

$$S = \sum_{j=1}^{n} Ai \cdot t$$

, where

S: generating point, Ai: coefficient vector, and
t: parameter ($0 \leq t \leq 1$)

Next, a value of the end coordinate x (m) is divided by a number of splits (n), and an X-coordinate is divided according to a number of colors (S108). The division value is stored in the color transition data storage section 17, and divided x-coordinates x1, x2, . . ., x (n) per division are calculated. Then, these values are stored in the color transition data storage section 17 (S109). Here, as to intervals of the divided coordinates in the X-coordinate direction, an interval between x0 and x1 is represented by Dx1, an interval between x1 and x2 by Dx2, . . ., an interval between x (n−1) and x (n) by Dx (n). Next, divided y-coordinates y1, y2, . . ., y (n) are calculated according to the divided X-coordinates and the formula of the splined curve, and these values are stored in the color transition data storage section 17 (S110). Intervals of the divided y-coordinates in the Y-coordinate direction are represented by Dy1, Dy2, . . ., and Dy (n) in the same manner as the above.

If a whole specified rectangular area is 1, a ratio of the intervals to the whole rectangular area is respectively calculated according to the intervals Dy1, Dy2, . . ., Dy (n) (S111), and the calculated values are stored as variations Vy1, Vy2, . . ., Vy (n) in the color transition data storage section 17. Moreover, "EXIST" is stored in the color transition flag (S112).

Then, the locus from the origin to the end point is drawn, and the color transition is calculated based upon the drawing curve. As a result, the ratio of each color to the whole area can be obtained, and the width of each color can be specified according to each ratio. For example, as shown in FIG. 17, when the slope of the drawn curve is gentle, the intervals in the Y-direction become small, so the widths of the colors become narrow. On the contrary, if the slope is steep, the intervals in the Y-direction become large, so the widths of the colors become wide.

Next, as shown in FIG. 21, after the process of S28 or S29, the image color arrangement conversion table 12 is retrieved (S30) based upon the data of images stored in the input data storage section 13. The start color, end color, character color, typeface, pattern number and rainbow number which are obtained by the retrieval are stored in the color arrangement data storage section 14 (S31).

Figure 22:
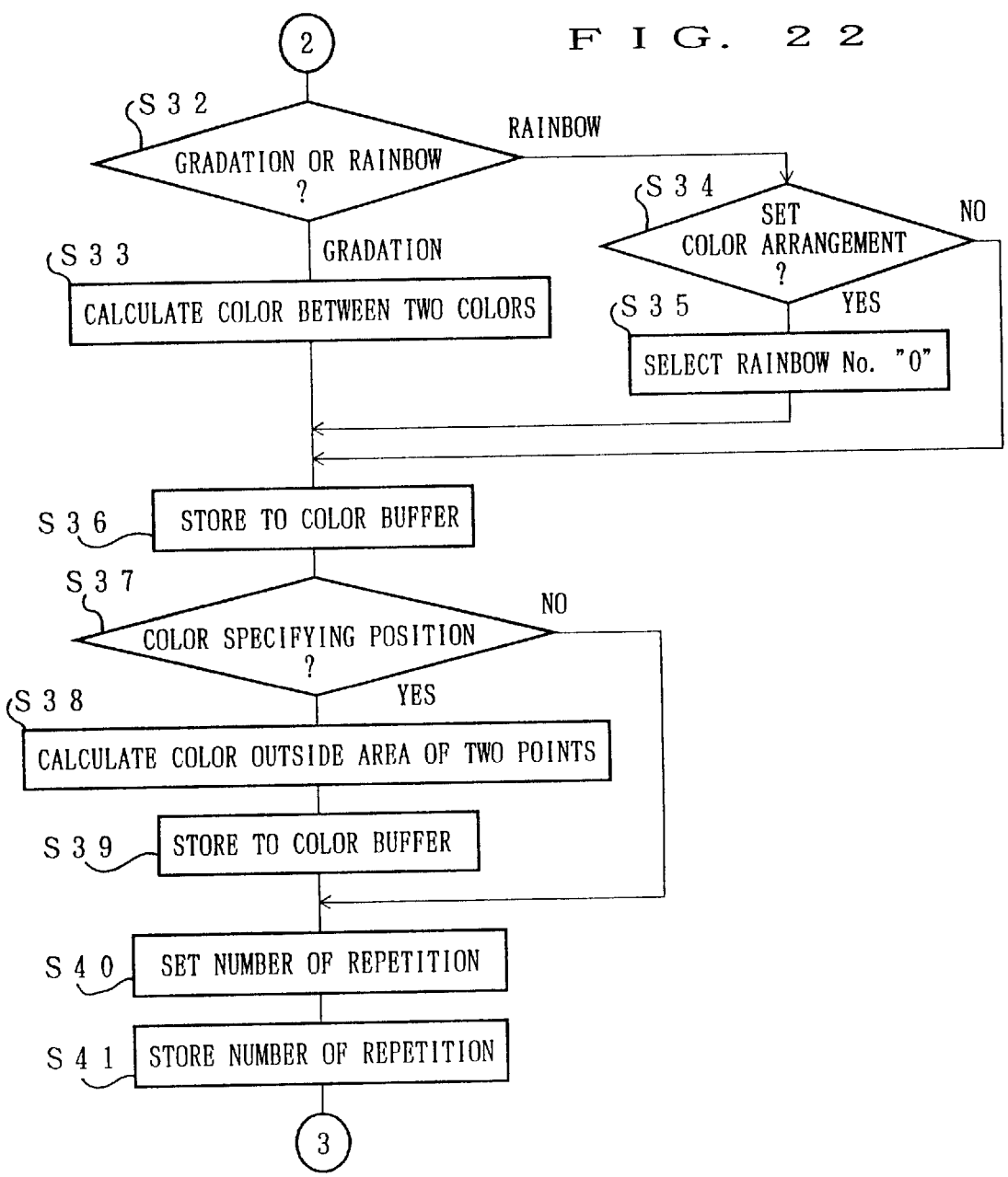
FIG. 22 is a flow chart following FIG. 21.

Successively, as shown in FIG. 22, a judgement is made as to the gradation or the rainbow (S32). In the case of the gradation, colors between the start color and the end color are obtained according to the stored start color, end color and number of splits (S33), and obtained colors are successively stored in the color buffer (S36). Meanwhile, in the case of the rainbow, a judgement is made as to whether the color arrangement is set (S34). When the color arrangement is set, data on the rainbow No. "0" table of the rainbow color arrangement table are selected (S35), and the selected colors are stored in the color buffer (S36). Moreover, when the color arrangement is not set at S34, the rainbow number is referred to, and the colors of the rainbow color arrangement table corresponding to the desired number are successively stored in the color buffer (S36).

Thereafter, a judgement is made as to whether a color specifying position exists (S37), and when the color specifying position exists, colors out of the area surrounded by the color specifying start point C and the color specifying end point D, which were specified at S26, are calculated. In other words, colors in the range from the color specifying start point C towards the outer direction and in the range from the color specifying end point D towards the outer direction are calculated (S38). Here, the colors in the outer directions are respectively the colors at the color specifying start point C and the color specifying end point D or are colors which are estimated based upon the gradation in the D→C direction and in the C→D direction. The obtained colors are again stored in the color buffer according to the order of the colors (S39). Thereafter, the number of times where a series of patterns in the gradation/rainbow is repeated is inputted (S40), and the set value is stored (S41).

Figure 23:
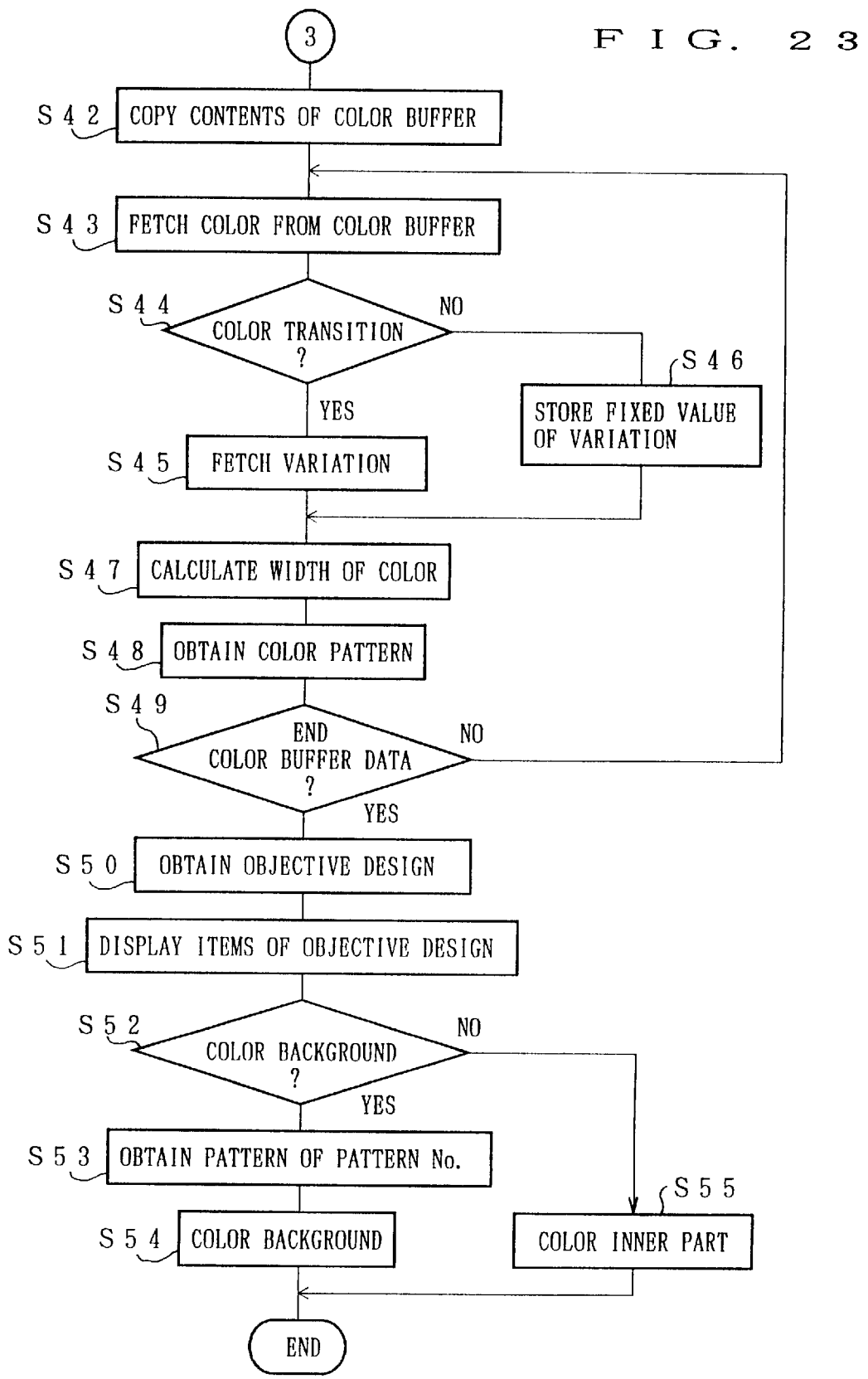
FIG. 23 is a flow chart following FIG. 22.
Figure 24:
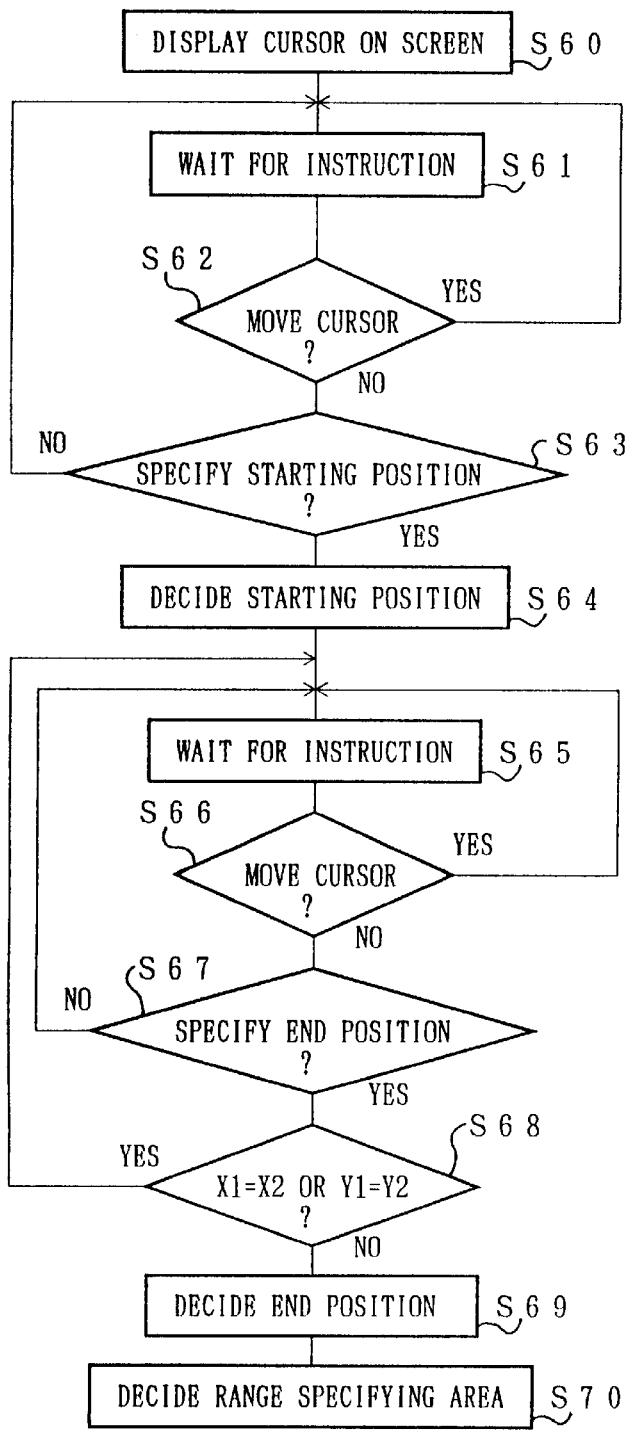
FIG. 24 is a flow chart which shows a range specifying operation of the image output device.

Then, as shown in FIG. 23, the contents of the color buffer are copied according to the set value of the number of repetition times, and the color buffers for a specified number of times are created (S42). Next, the colors are successively taken out from the color buffers (S43), and a judgement is made as to whether the color transition is set (S44). When the judgement is made that the color transition is set at S44, the variations Vy1, Vy2, . . ., Vy (n) are successively taken out from the color transition data storage section 17 (S45), and the widths of the colors are calculated based upon the variations and the number of repetition times (S47). Meanwhile, when the judgement is made that the color transition is not set at S44, fixed values of the variations are set (S46), and the widths of the colors are calculated in the same manner as the above (S47). After the calculation of the color widths, the color patterns are obtained according to the respective color widths (S48).

Figure 18:
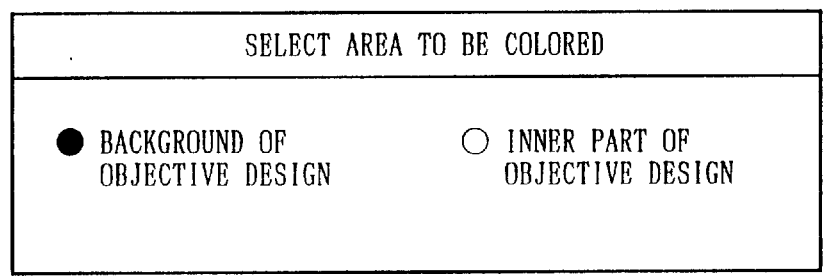
FIG. 18 is an explanatory drawing which shows a display example of a selection window of an area to be colored.

Thereafter, a judgement is made as to whether the data of the color buffer are finished (S49), when the data is not finished, the sequence returns to the step S43. When the data is finished, the pattern of an objective design is obtained (S50). Here, the objective design also includes characters, etc. Then, as shown in FIG. 18, a window, for selecting an objective portion to be colored from the background of the design or the inner part of the design, is displayed (S51). A judgement is made as to whether the objective portion to be colored is a background (S52), and when it is the background, an outline pattern according to the pattern number stored in the color arrangement data storage section 14 is obtained (S53). Then, the background is colored according to the pattern (S54). Meanwhile, when the objective portion to be colored is not background at S52, the inner section of the design is colored according to the pattern of the gradation/rainbow (S55).

Figure 27C:
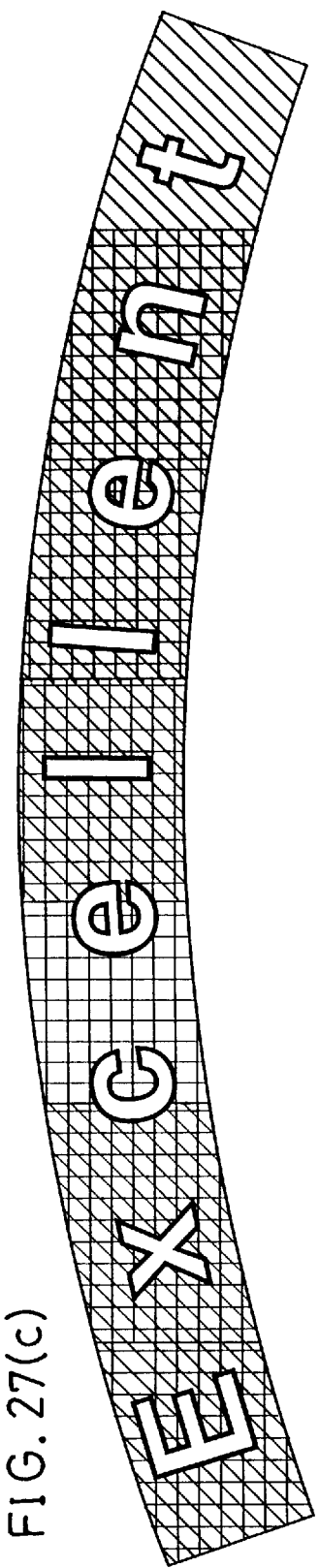
FIG. 27(c) is an explanatory drawing which shows an example of an output image when the rainbow is selected.
Figure 27D:
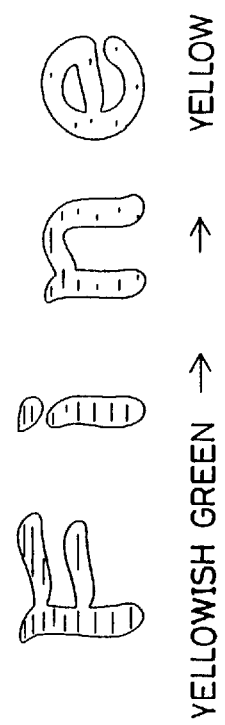
FIG. 27(d) is an explanatory drawing which shows an example of an output image when an inner section of a character has gradation.
Figure 29:
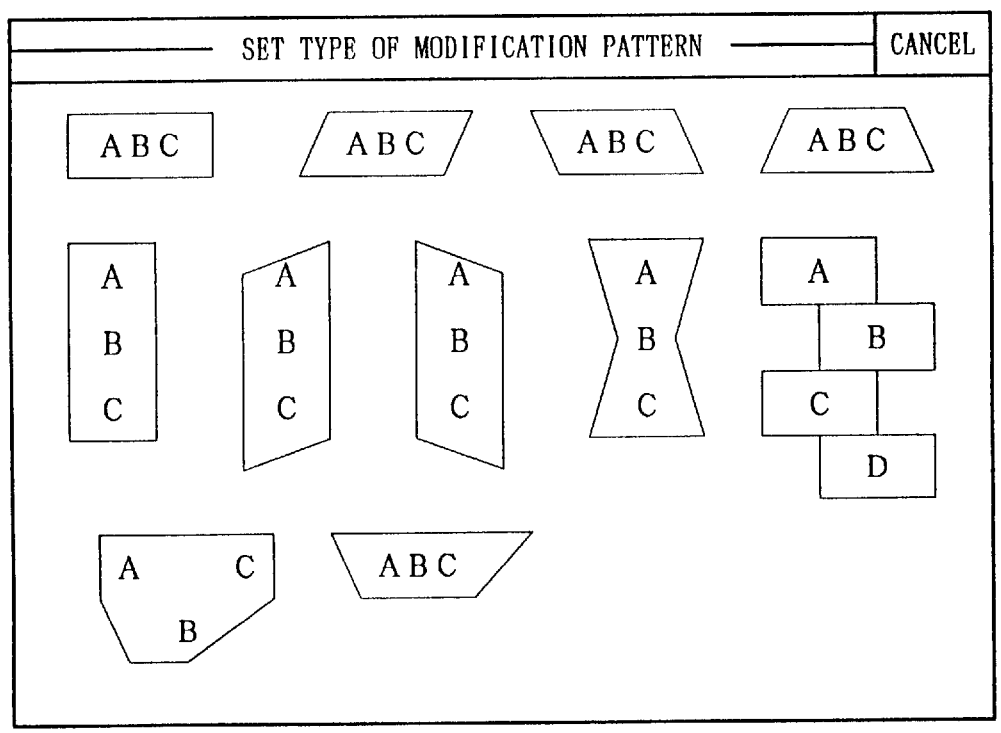
FIG. 29 is an explanatory drawing which shows an example of a window when a type of modification pattern is selected on the above setting window.
Figure 30:
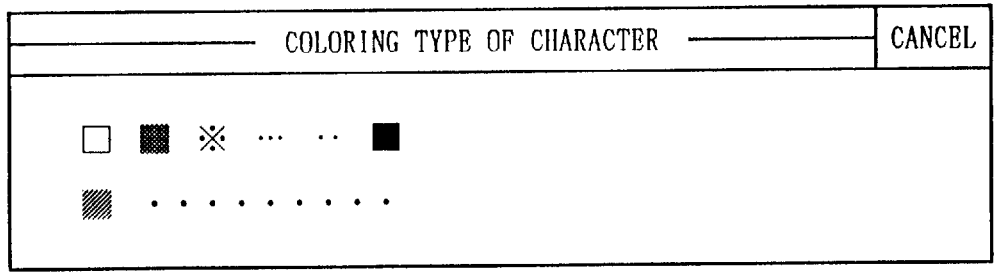
FIG. 30 is an explanatory drawing which shows an example of a window when coloring type of character is selected on the setting window.
Figure 31:
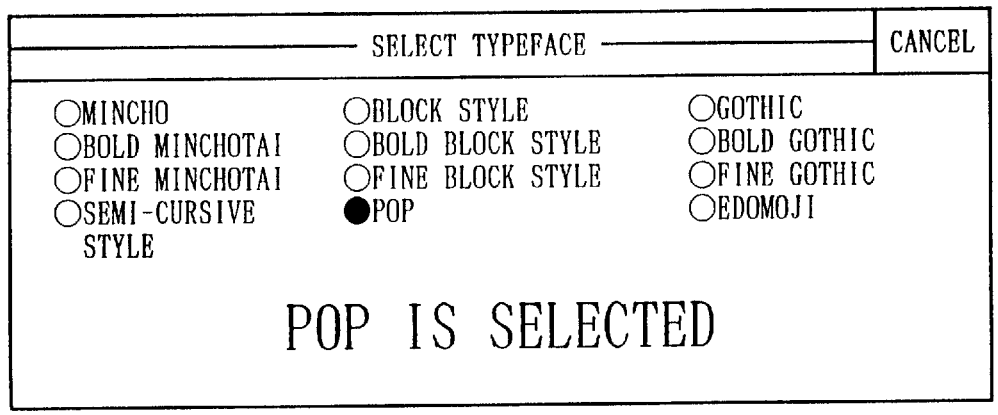
FIG. 31 is an explanatory drawing which shows an example of a window when typeface is selected on the setting window.
Figure 32:
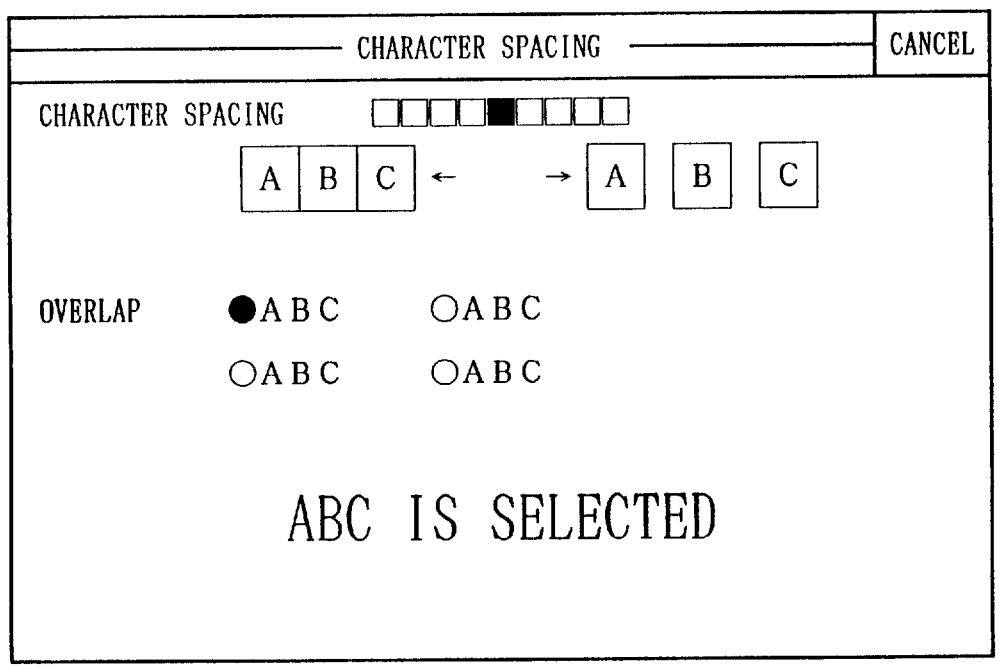
FIG. 32 is an explanatory drawing which shows a window when character spacing is selected on the setting window.

FIG. 27 shows an example in the case where the above operation is actually performed. FIG. 27(a) shows an example of the gradation, and FIG. 27(b) shows an example when coloring by gradation is repeated twice. Moreover, FIG. 27(c) shows an example of the rainbow, and FIG. 27(d) shows an example wherein inner sections of characters are colored by gradation.

The image output device of the present embodiment has an arrangement which is capable of automatically determining colors of gradation and rainbow, colors of characters and backgrounds, and a typeface based upon the selected type of a document and its image word. Therefore, compared to a conventional device in which colors and a typeface should be set individually by a user, since the device of the present invention automatically determines each arrangement section of outline representation arranged by combination of colors and typefaces, each arrangement section can output color representation according to objects regularly and easily.

In addition, specifying items, which is troublesome at the time of the operation, is decreased so that the operation can be easily performed. Furthermore, the above functions can be performed by specifying items which do not require any special technique and knowledge. In other words, since the outline representation using fine color representation, such as gradation, is automatically created by an easy operation, a user who is not accustomed to the operation of the device can easily create a document including the outline representation. Moreover, fine and colorful representation is possible by a combination of typeface, character color, background color, etc. At this time, needless to say, the characters and backgrounds can be colored by the gradation or rainbow.

In addition, an area to be colored by the gradation/ rainbow can be specified only by specifying two points in a screen. Therefore, color representation according to an image of a document can be automatically determined by an easy operation for specifying a range and selecting an image of a document. Moreover, when the color specifying position is set within the specified area, the color representation can be made more colorful.

In addition, when the color transition is set, a dragging speed and a change rate of coordinates are extracted from a dragging wave inputted by a pointing device, such as a stylus pen, and the colors composing the gradation/rainbow can be displayed along the locus at suitable intervals. Therefore, strain is not put on a pressure sensor unlike the conventional device. Moreover, delicate representation, such as wave of the gradation/rainbow, is possible based upon the dragging speed and the change rate of the coordinates, thereby making it possible to realize a colorful representation. As a result, the functions of the present invention can be realized accurately by a general coordinate input pen.

Furthermore, when the background of an objective design or the internal section of an objective design is selectively specified within the set area of the gradation/rainbow, an objective area for the gradation/rainbow can be determined. As a result, since the selecting range of a combination of colors in the backgrounds and in the inner section becomes wide, the outline representation can be created colorfully and variously.

In addition, since a series of color representations can be repeatedly displayed within the specified area, it is not necessary to repeat the same operation, thereby making it possible to simplify the operation and shorten the operating time.

Further, when color transition, which was previously specified, is stored at specifying of the rainbow and a color band group is represented by colors based upon the stored color transition data, non-uniform combinations, namely, variant combinations of colors can be realized, thereby making it possible to realize colorful representations.

Here, the tables and windows of the present embodiment are examples, so they are not necessarily limited to them. In other words, the tables are specified by characters and numerals, but other symbols may be used.

EMBODIMENT 2

The following describes another embodiment of the present invention referring to FIGS. 33 through 56.

Figure 34:
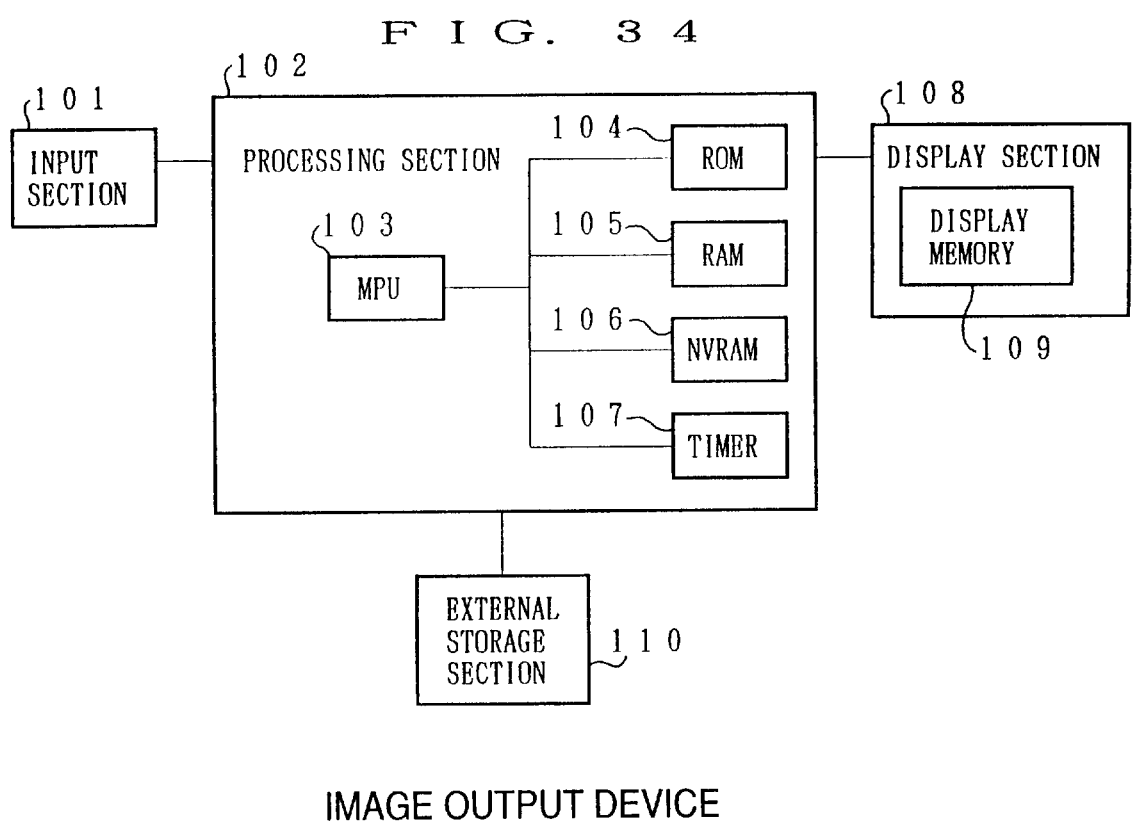
FIG. 34 is a block diagram which shows an arrangement of the above image output device.

As shown in FIG. 34, an image output device of the present embodiment is provided with an input section 101, a processing section 102, a display section 108 and an external storage section 110.

The input section (input means) 101 is composed of a keyboard, a mouse, a touch key, and a pen, etc., and it inputs instructions to be executed and data required by the processing section 102 thereinto. Moreover, the input section 101 specifies color, patterns, etc.

The processing section (processing means) 102 controls a whole arranged system, and executes and processes instructions specified in the input section 101. The processing section 102 is provided with an MPU 103, a ROM 104, a RAM 105, an NVRAM 106 and a timer 107. Data can be written to the NVRAM 106 like the RAM 105, and the NVRAM 106 is a storage element whose contents are not eliminated even if a power source is shut off.

The display section (display means) 108 is composed of a display device such as a CRT, LCD, etc., a display memory 109, a display control unit, etc. The display section 108 displays graphics according to data of the display memory 109.

The external storage section 110 is composed of a hard disk, a floppy disk, etc. The external storage section 110 is used for temporarily storing data according to demands for processing a program and the processing section 102, or to store data according to demand for a user.

Figure 33:
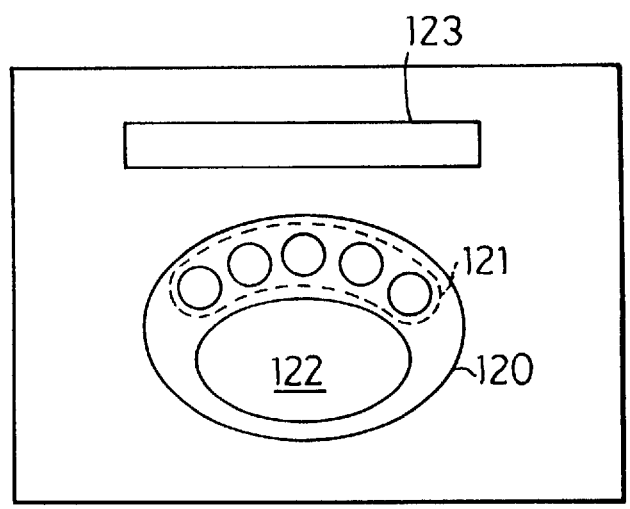
FIG. 33 is an explanatory drawing which shows a basic screen in a display section of an image output device according to another embodiment of the present invention.

Here, the storage means corresponds to the ROM 104, the RAM 105, the NVRAM 106, the display memory 109 or the external storage section 110. FIG. 33 shows a basic screen at the time of creating colors to be displayed on the display section 108. This basic screen graphically shows a design imaged as a palette to be used drawing a picture with water colors. An image palette (hereinafter, referred to as only a palette) 120 for creating mixed colors and a function selection display group 123, such as icons, are displayed on the basic screen. The palette 120 creates colors in like manner of actually mixing water colors. The function selection display group 123 is arranged on the upper part of the palette 120, and a user changes the screen to the former application or executes functions, mentioned later, in saving and calling basic colors and created colors. Here, the function selection display group 123 may appear in any areas other than the position of the palette 120.

In addition, a basic color display group 121 appears on the upper portion in the palette 120, and a color mixing area 122 appears on a center portion in the palette 120. When the user executes inputs from the lower side of the screen or the right side, if the user is right-handed, using the input section 101, such as a pen, the above arrangement of the screen prevents the basic color display group 121 from being blocked by the hand of the user, and the user can always see the basic colors currently displayed.

The basic colors display group (basic color display area) 121 shows basic colors to be used for mixing in like manner of putting water color on a palette. The user selects basic colors displayed on the basic color display group 121 and mixes them in the mixing area 122. In the mixing area 122, the basic colors are mixed, creating mixed colors, and the basic colors are mixed, or the mixed colors are mixed. In other words, colors, which can be mixed, are not only the basic colors, but mixing colors in the mixing area 122 are also used for mixing. Here, colors, which are displayed as the basic colors on the basic color display group 121, are commonly used for mixing. Since a number of such basic colors are small, the user can specify desired basic colors without difficulty.

Figure 35:
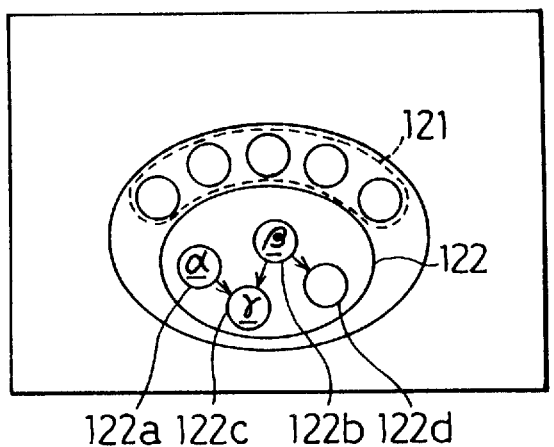
FIG. 35 is an explanatory drawing which shows color mixing and copying operations within a color mixing area.

In addition, as to the mixing area 122, a place where mixing colors are created is not necessarily limited to one portion, and mixing colors can be created in a plurality of places. In other words, as shown in FIG. 35, mixing colors can be created in four places: areas 122a, 122b, 122c and 122d, for example. When mixed colors are created in a plurality of places, mixing colors can be copied to another place in the color mixing area 122. As a result, a desired color can be created while being compared to other colors which are created in a plurality of places.

An example of the copying is described. For example, if a mixed color is created in the area 122b, in the case where the mixed color is desired to be changed sightly, the mixed color should be stored. At this time, when the mixed color is selected and the cursor is moved to the area 122d, the same mixed color is displayed in the area 122d. This is a copying operation. The copying operation can be performed not only within the color mixing area 122 but also from the basic color display group 121 to the color mixing area 122. Here, the cursor (object indicating means) shows an objective portion on the screen.

In addition, an example of creating mixed colors in the color mixing area 122 is described. Colors α and β in the area 122a and the area 122b are colors created in the area or colors obtained by copying from basic colors. When the color a is selected and it is copied to the area 122c, the area 122c is put in the color α. Next, when the color β is selected and it is mixed with the color α in the area 122c, the color of the area 122c changes to a color γ. The color γ is obtained by mixing the color α and the color β. This is the color mixing operation in the mixing color area 122.

Here, a format of color data is described.

Figure 36:
FIG. 36(a) is an explanatory drawing which shows a data format of basic colors in the case of only color data.
FIG. 36(b) is an explanatory drawing which shows a data format of basic colors in the case where the data includes pattern data and the pattern is a fixed pattern.
FIG. 36(c) is an explanatory drawing which shows a data format of basic colors in the case where the data includes pattern data and the pattern is a non-fixed pattern.
Figure 36:
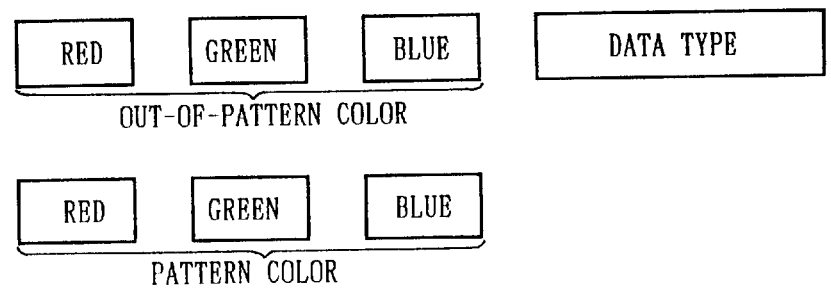
Figure 36:
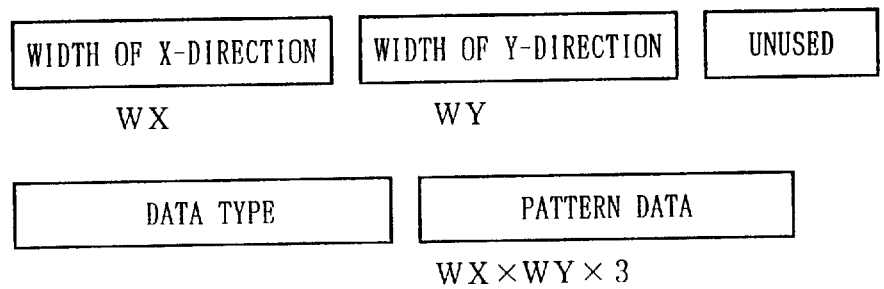

Basic color data are managed by formats shown in FIG. 36, and they are stored in the ROM 104, the RAM 105 and the NVRAM 106. The basic colors on the palette 120 are displayed based upon the data. Therefore, when the basic colors on the palette 120 are selected, the formats shown in FIG. 36 are acquired as cursor data and the colors of the cursor are changed to colors or patterns which are the same as the selected basic colors.

Basically, as shown in FIG. 36(a), brightness of three primary colors of a light (red, blue, green), which are basic colors, is changed so that colors are created. 8 bits are allocated to each primary color. Since a number of displayable colors is determined by a number of bits of brightness allocated to each color, display in $1677 \times 10^4$ ($256 \times 256 \times 256 = 1677.8 \times 10^4$) colors becomes possible by allocating 8 bits of each color to one pixel.

In addition, there exists a data type area which shows a type of data besides the area showing the three primary colors. Information on a type of data, such as color data and pattern data, is stored in the data type area. The pattern is a form of colors for recognizing a design and a figure according to differences in colors by using not less than two types of colors (including transparent color). Moreover, not only colors but also a pattern and a color can be mixed.

In the case where the color mixing is carried out, a color mixing method and a display method are determined based upon the data in the data type area. Moreover, in the case where a pattern and a color are mixed, a judgment is made as to whether the pattern to be mixed with a color is a fixed pattern or non-fixed pattern according to the data in the data type area. Here, the fixed pattern is a pattern, such as a checked pattern or polka dots, which is previously set, and the non-fixed pattern is a pattern which is made by a user.

Since the data of the fixed pattern is desired to have a storing format which closely resembles the above, they are arranged as shown in FIG. 36(b). In other words, the data of the fixed pattern is arranged so that data of pattern colors, which is judged as to their existence or non-existence according to a data type, are added to the format shown in FIG. 36(a). Namely, the fixed pattern is previously set, the data of the fixed pattern is composed of only a symbol showing the type of the fixed pattern and areas of an out-of-pattern color and of a pattern color. Here, the out-of-pattern color is the color of a background of the pattern.

Since the data of the non-fixed pattern is also desired to have a storing format which closely resembles the above, they are arranged as shown in FIG. 36(c). In other words, the data of the non-fixed pattern is arranged so that the data of the colors shown in FIG. 36(a) are changed into data with a size of the non-fixed pattern and that the pattern data, which are judged as to existence or non-existence according to a data type, are added. Namely, the data of the non-fixed pattern are not arranged like FIGS. 36(a) and 36(b), but are composed of a width of the X direction (low order), a width of the Y direction (low order), disuse, a data type and pattern data. In the case of the non-fixed pattern, a data area for (data width of the X direction WX)×(data width of the Y direction WY) dots is required per 1 color. Here, since three colors are displayed, the pattern data area for (WX)×(WY)×3 dots is required.

An unused area is used as a dummy. However, in this case, when 8 bits are allocated to the data widths of the X and Y directions WX and WY, the non-fixed pattern can be represented only by 256 (WX)×256 (WY) dots. Therefore, in order to expand the area, the unused area may be used as the area represented by the width of the X direction (high order) and the width of the Y direction (high order). In this case, for example, an additional 4 bits are allocated to each direction, and the non-fixed pattern can be represented by up to 4095 (WX)×4095 (WY) dots. Moreover, when information about a number of added bits is written to the data type, a number of bits can be changed. For example, when "100" is written to 3 bits of the data type, each additional allocation of the X and Y directions becomes 4 bits respectively, and when "101" is written, the additional allocations become 5 bits and 3 bits respectively.

In the case where colors are mixed, a mixing ratio, mentioned later, is calculated and colors after the color mixing are determined.

The area of the basic colors is managed by a table shown in FIG. 37, for example. "Basic color Nos." are numbers which are given for convenience, and in the case where basic colors are obtained or changed, the numbers are used for distinguishing from another basic color. "Basic color display" is setting as to yes/no of setting, and a number of display contents of basic colors on the basic screen can be reduced and increased by operating the "basic color display".

"Display coordinate" relates to coordinates on the screen showing basic colors. The coordinates are set so that a display form of basic colors specified in "form of display", mentioned later, is considered and basic colors are always positioned on the palette 120. "Address where color data exist" is set so that a head of the basic color data to be displayed (see FIG. 36) is indicated. "Form of display" is a form of display of basic colors, and a number of a form of display previously determined is stored. The basic colors are displayed based upon these data.

In accordance with the above table of FIG. 37, it is possible to move basic colors to be displayed, to increase or decrease a number of basic colors and to change the form of display of basic colors. At this time, the color mixing area 122 is actually an area other than the area where basic colors on the palette 120 are displayed (basic color display area).

Figure 38:
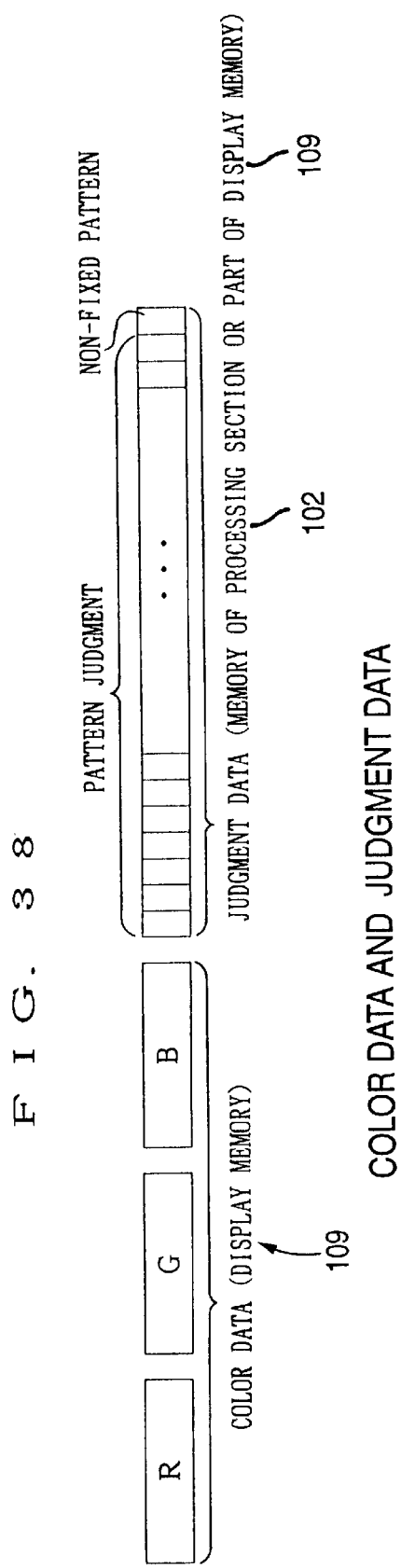
FIG. 38 is an explanatory drawing which shows color data and judgment data.

In addition, color data to be displayed on the display section 108 is used as color data to be displayed on the color mixing area 122, and the form of this color data is coincided with the form of the basic color data in FIG. 36, thereby making it possible to display the color data in the color mixing area 122. However, a fixed pattern, mentioned above, is occasionally added to the colors of the color mixing area 122. In this case, a judgment memory is used for distinguishing the color data from the pattern data. The judgment memory is allocated onto the RAM 105 or to a portion of the display memory 109. These are shown in FIGS. 34 and 38.

In other words, the color data on the palette 120 are represented by the three primary colors like the other areas, and they are on the display memory 109. The display section 108 converts the color data into a signal which can be handled by the display device so that display is carried out. Meanwhile, a judgment data area exists in the judgment memory. The judgment data in FIG. 38 are one example. The judgment data basically exists per 1 dot, the data includes data about judgment as to whether non-fixed pattern exists or not, about a type of a fixed pattern, etc. The color mixing and display are carried out referring to this area.

Figure 39:
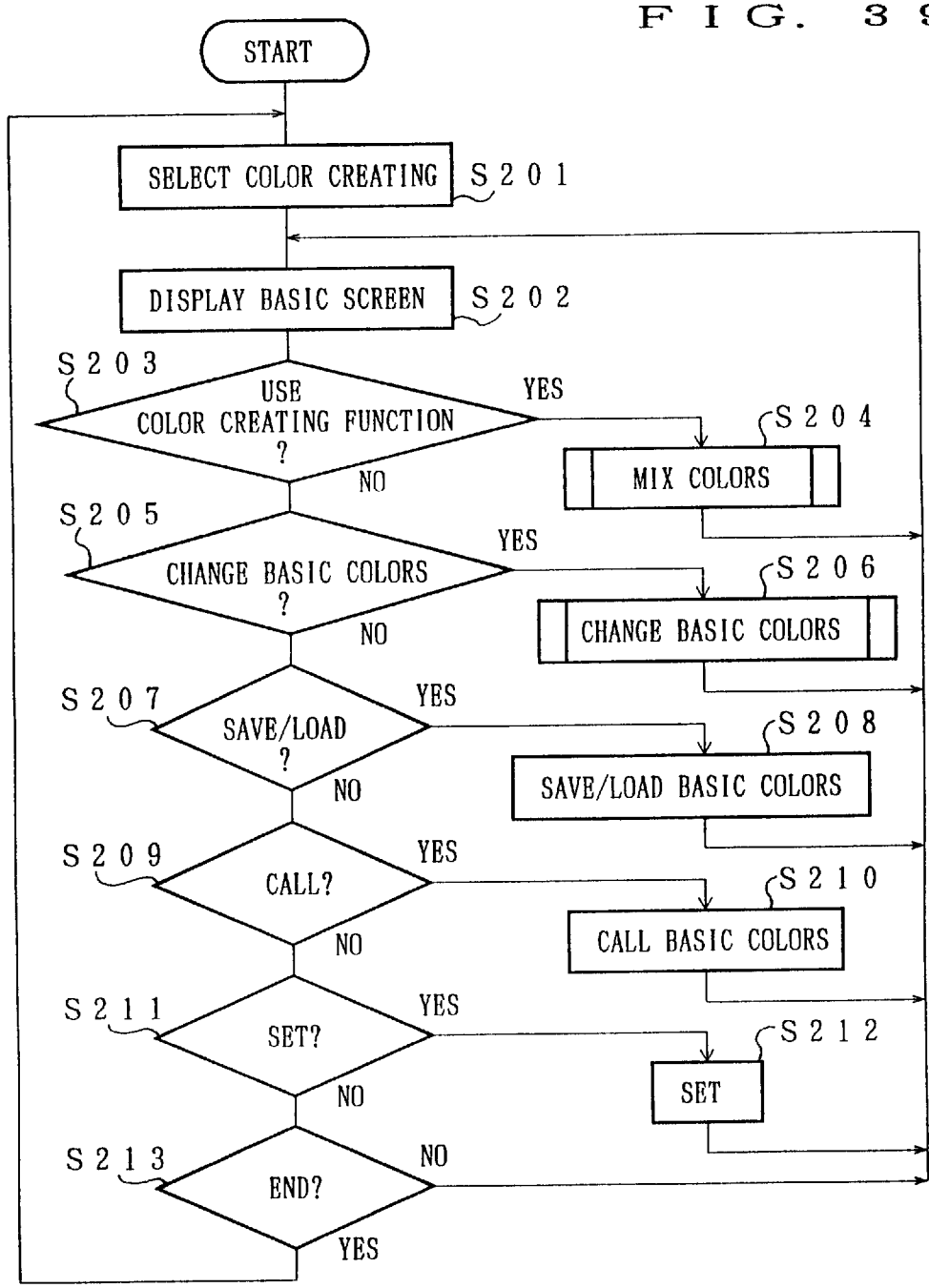
FIG. 39 is a flow chart which shows a basic operation of a color creating function in the image output device.

The basic operation of the image output device having the above arrangement is described referring to the flow chart in FIG. 39.

When the user selects color creating in a drawing application (S201), a basic screen for the color creation shown in FIG. 33 appears (S202). In the case where the color creating function is used on the basic screen (S203), a process for creating mixed colors is performed (S204). When the color creating function is not used and "basic color change" is selected (S205), the basic colors shown on the basic color display group 121 are changed (S206).

In addition, when the "basic color change" is not selected and "save/load" is selected (S207), the basic colors are stored/loaded (S208). When the "save/load" is not selected and "call" is selected (S209), the stored colors are called. At this time, a place on which the colors are called is previously specified, the specified place is replaced with the called colors (S210).

When the "call" of the basic colors is not selected and "set" is selected (S211), a parameter, such as the color mixing ratio, to be used for color mixing is set (S212). When "set" is not selected, a judgment is made as to whether the process is ended (S213).

When desired colors are created in the above manner, the color creating process is completed. Then, the created colors are set to colors for drawing and the sequence returns to the application so that drawing is carried out. Here, in the case where the sequence returns to the application or goes to another function (color mixing, basic color changing, loading, calling, etc.) on the color creating function, when a selection is made among the contents of the function selection display group 123, the selected function is performed.

The following describes each process for creating mixed colors, changing basic colors, saving/loading, calling and setting.

Figure 40:
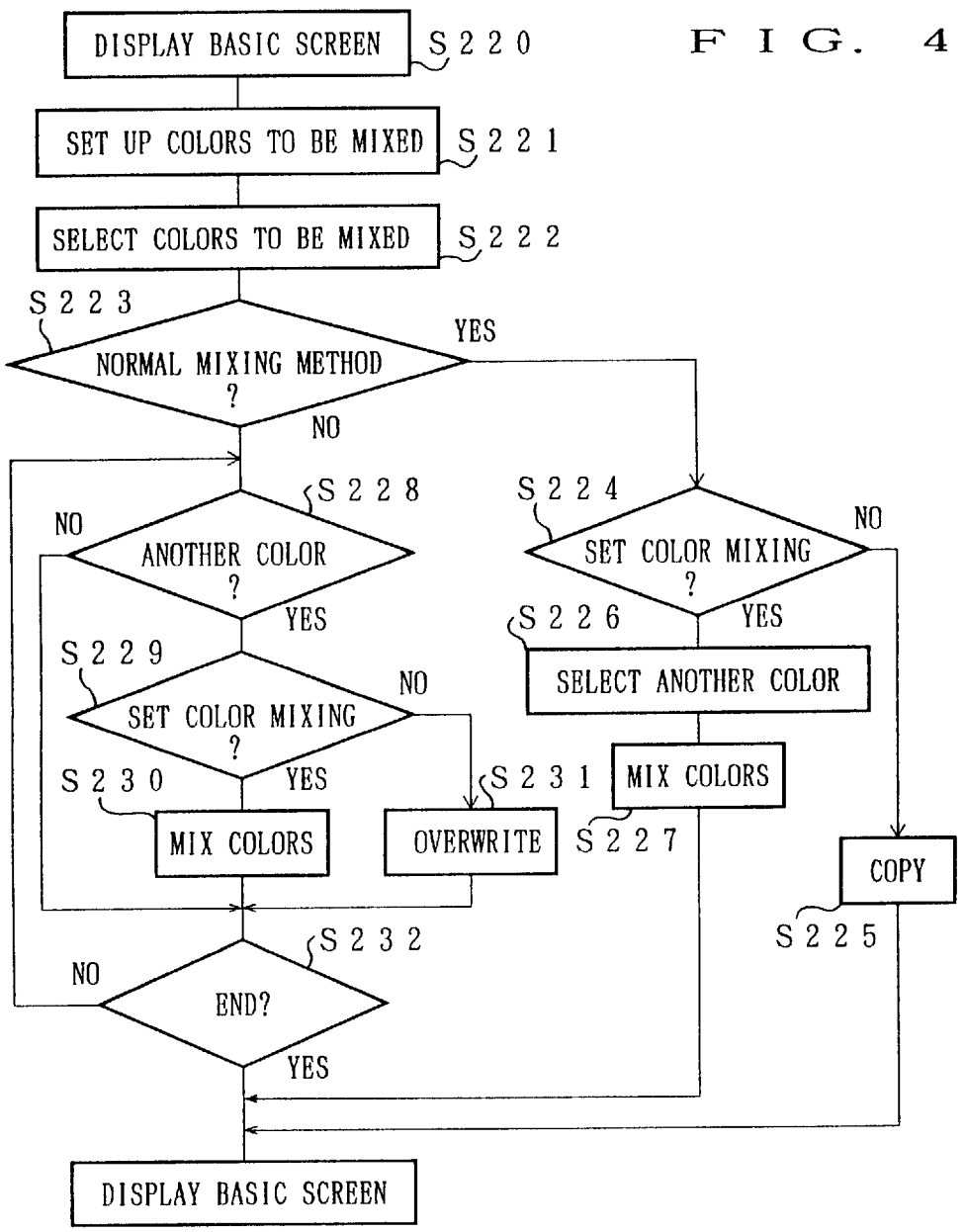
FIG. 40 is a flow chart which shows an operation for creating a mixed color.

First, the process for creating mixed colors at S204 is described referring to the flow chart of FIG. 40 and FIG. 41. Here, the colors in parentheses are examples in the case where purple is created.

Colors (red and blue) to be mixed are prepared on the basic screen (S220). In other words, these colors are displayed on the screen (S221). At S222, one color (red) is selected from the basic colors on the palette 120 or a created color in the color mixing area 122 by the input section 101 (see FIG. 41(a)).

At this time, as to the color selecting method, in the case of using a keyboard, symbols are respectively given to the basic colors, and a color is selected with the symbols. In the case of using a mouse, a color is selected by moving the cursor to a desired color by means of the mouse and clicking the mouse. In the case of using a pen, a color is selected by touching a desired color by a point of the pen.

Next, a judgment is made as to whether the color mixing method is the normal color mixing method or the water color-like color mixing method (S223). In the case where the usual color mixing method is used at S223, the cursor is moved to the color mixing area 122 with a color selected. At this time, a judgment is made as to whether color mixing is set (S224). In the case where the color mixing is not set at S224, the color mixing area 122 is turned into the same color (red) as the color selected at S222. In other words, the color is copied (S225).

Meanwhile, in the case where the color mixing is set at S224, a color of the color mixing area 122 is the previously created color or default (red). Then, when another color (blue), which is not the color selected at S222 and copied to the color mixing area 122, is selected at S222 (S226), colors are mixed at a mixing ratio, mentioned later, at S227, and the color of the color mixing area 122 is changed (reddish purple) (see FIG. 41(b)).

In such a manner, when the colors are mixed in the color mixing area 122, the user can checks for the mixing state. The desired color (purple) is created by repeating the above process arbitrary times (see FIG. 41(c)).

Meanwhile, the case where the water color-like color mixing method is selected at S223 is described referring to FIG. 42. Here, the water color-like color mixing method is a method for mixing colors in like manner of mixing actual water colors.

Figure 42A:
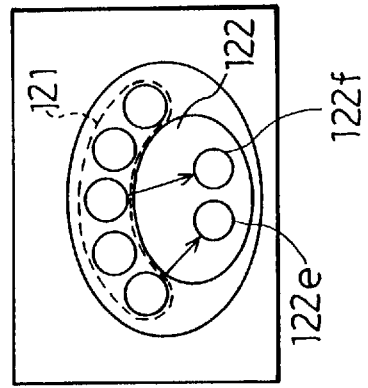
FIG. 42(a) is an explanatory drawing which shows the case where colors to be mixed are selected by using a water colors-like mixing method.

The color selected at S222 is copied to the color mixing area 122. Moreover, a color to be mixed with the copied color is selected and copied thereto. In other words, as shown in FIG. 42(a), the basic colors shown in the basic color display group 121 are copied to areas 122e and 122f. In this state, a judgment is made as to whether the color of the cursor is different from the color of the color mixing area 122. In other words, since the color of the cursor is turned the same color as the color copied later (here, the color of 122f), the color of the cursor is compared with the color copied previously (here, the color of 122e) (S228). When the colors are different at S228, the judgment is made as to whether the color mixing is set (S229).

Figure 42B:
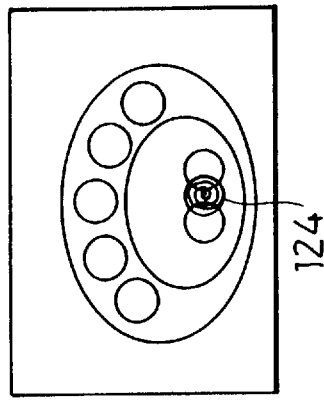
FIG. 42(b) is an explanatory drawing which shows the case where two colors are mixed.

Then, in the case where the color mixing is set at S299, the cursor is dragged as shown by a locus 124, for example, in like manner of mixing water colors (see FIG. 42(b)). As a result, the colors are mixed only in the portion of the locus 124 (S230). Here, in the usual color mixing method, the color of the cursor is not changed (is not mixed), but in this color mixing method, the color of the cursor is changed in like manner to that of a color of a brush being changed in the case of mixing water colors with the brush. In other words, the color mixing is carried out on the color of the cursor. Next, a judgment is made as to whether the process is ended (S232), and when the process is ended, the basic screen appears. When the process is not ended, the sequence goes to the step S228.

Figure 42C:
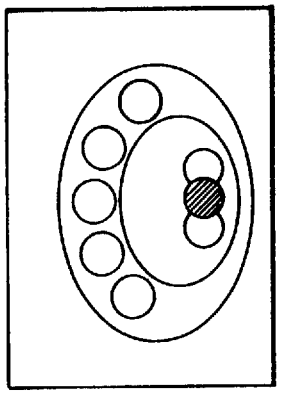
FIG. 42(c) is an explanatory drawing which shows the case of over-writing.

Meanwhile, in the case where the color mixing is not set at S229, overwriting is executed at S231 (see FIG. 42(c)), and the sequence goes to the step S232. Moreover, in the case where the cursor is the same as the color mixing area 122 in color, the sequence does not go to the steps S229 and S230, but goes to the step S232. The color mixing method at S223 can be selected among the function selection display group 123 on the basic screen.

The following describes the color mixing set at S224 and S229.

When the cursor moves to the color mixing area 122, if the color mixing is not set, only colors are stored to the judgment memory. This is done per 1 pixel unit in the color mixing area 122 of the palette 120.

When colors are mixed after the color mixing is set, calculation is made in the processing section 102 based upon the color data of the cursor, the color data of the display memory 109 and the mixing ratio. The calculated result is stored in the display memory 109 and the judgement memory, and the color of the color mixing area 122 is changed. At this time, only the color of the color mixing area 122 previous to the color mixing is changed.

Figure 41A:
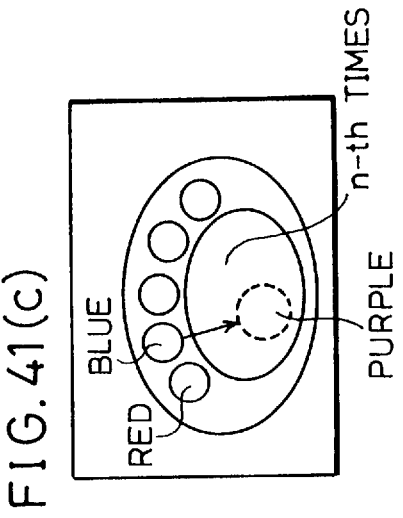
FIG. 41(a) is an explanatory drawing which shows a first operation of a usual color mixing operation.
Figure 41B:
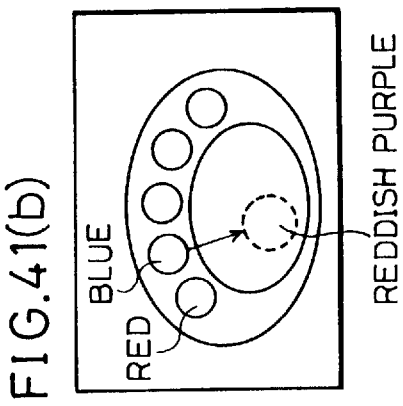
FIG. 41(b) is an explanatory drawing which shows a second operation.
Figure 41C:
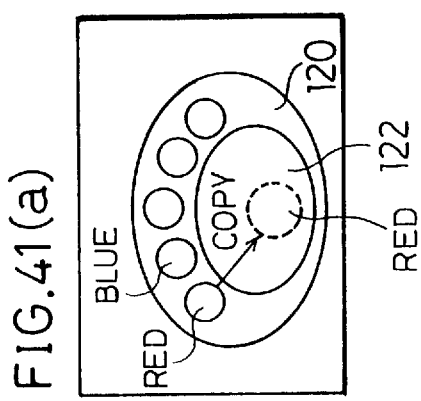
FIG. 41(c) is an explanatory drawing which shows a n-th time operation.

For example, a red area previous to the color mixing is created and determined (see FIG. 41(a)). Blue is mixed with the red in the red area (See FIG. 41(b)). Just when blue is mixed with red, the processing section 102 changes the whole red area of the color mixing area 122 into the mixed color (reddish purple).

In other words, when the color mixing process is executed, a judgment is made as to whether an obtained color (in the above case, red) exists next to the position of the cursor, and when the obtained color does not exist, the color mixing process is ended. When the obtained color exists, the color mixing process is executed also on a position (coordinate) where the color exists. The whole red area is changed by repeating this process. Here, the area is judged by a method that the color of the palette 120 cannot be set as mixed colors or basic colors or a method for obtaining the color of the color mixing area 122 from the display memory 109.

Figure 43:
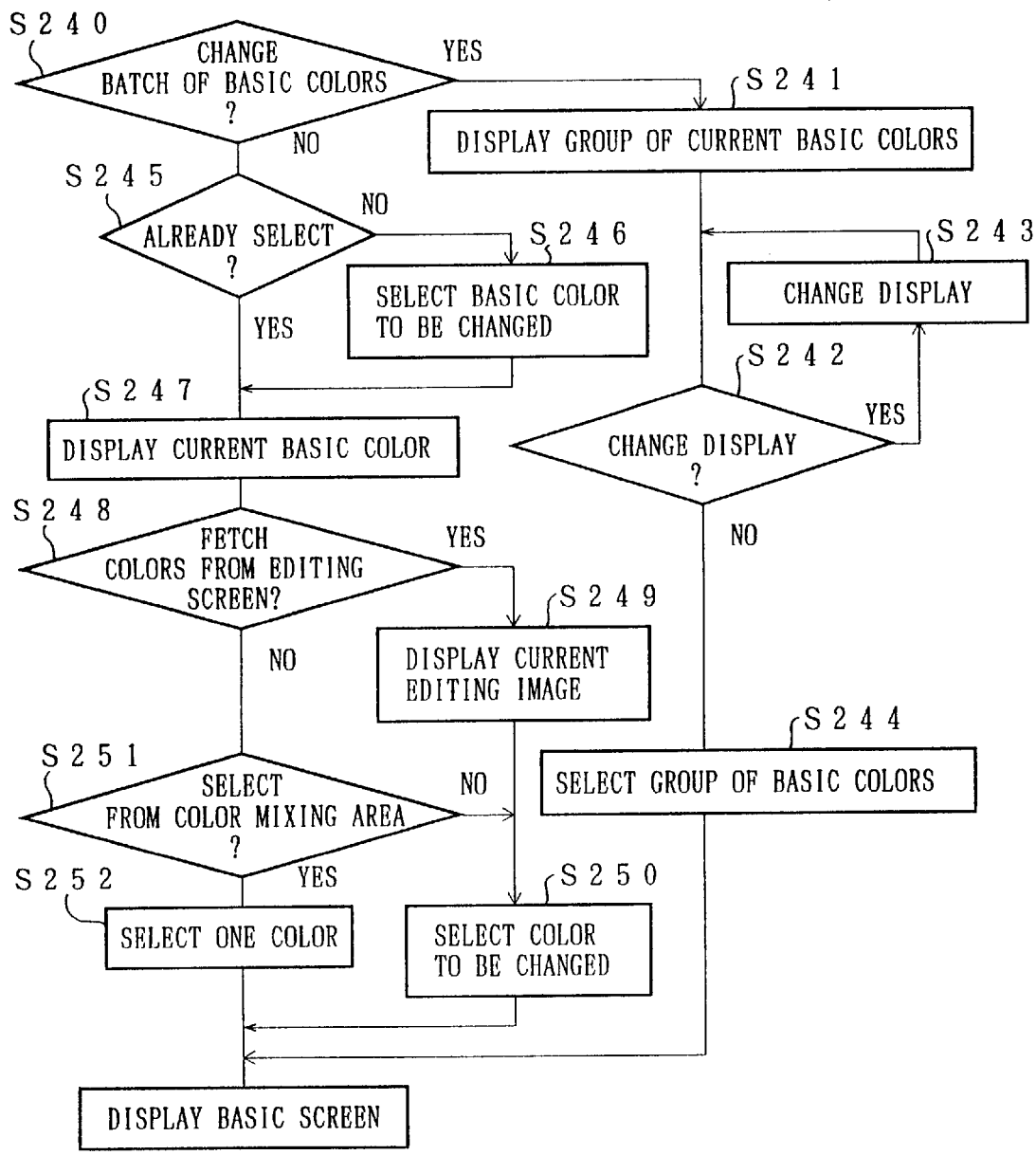
FIG. 43 is a flow chart which shows basic colors changing operation.

The following describes the basic color changing process at S206 referring to the flow chart in FIG. 43.

The basic colors are changed by replacing all the basic colors of the basic color display group 121 or by changing one of the basic colors. Therefore, first, a judgment is made as to whether the basic colors are batch converted (S240). In the case where all the basic colors are replaced, a basic color group and a mixed color group created by a user are previously displayed on a basic color change selection screen shown in FIG. 45 (S241).

At this time, the basic colors are not only arranged. The basic colors to be displayed can be limited by words, which represent shading of colors and images of colors, such as warmth, coolness and a reddish color. The conditions of the limitation are based upon data representing the conditions of the limitation shown in FIG. 44, for example. This data is compared with the basic color data or this data is retrieved so that required basic colors are extracted. With this method, when a certain color is selected so as to be used as a retrieving condition, it is possible to retrieve a similar color from the basic colors.

When the color mixing process is executed, the basic colors can be changed by using the words representing the images of the colors. For example, when "warm" is selected as a mixing result from the function selection display group 123, etc., colors required for creating the color representing "warm" are prepared as the basic colors of the basic color display group 121. In other words, not only the basic colors which satisfy the conditions of the words and the parameters shown in FIG. 44 but also its related colors are prepared.

As shown in FIG. 45, names of the basic color groups 141, a basic color display section 142, a specifying section 143 and color image words 144 are displayed on the basic color change selection screen.

As to the names of the basic color groups 141, the names are given respectively to the basic color groups for convenience of selecting from the basic color groups, and alphabets, numbers, etc. can be used. A user selects a desired basic color group by inputting the name of the basic color groups 141. On the basic color display section 142, not only previously specified basic colors are displayed but also freely set basic colors are displayed if they exist. When all the basic color groups cannot be displayed on the basic color change selection screen, the specifying section 143 shows the following groups or it is used for making a selection from the colors stored in the external storage section 110. The color image words 144 represent images of the colors, and when a selection is made from the words, basic colors, which satisfy the selected image of the color, are displayed on the basic color display section 142.

As shown in FIG. 43, after the step S241, a judgment is made as to whether a display of the basic color groups, which are currently on the basic color display section 142, is changed (S242), and in the case where the display is changed, the user searches for a desired basic color group so as to change the display using the specifying section 143 (S243). When not changing the display at S242, the user selects a basic color group from the basic color display section 142 so as to change the display of the basic color group on the basic screen (S244).

Meanwhile, in the case where one color of the basic colors is changed at S240, first, a judgment is made as to whether a target basic color to be changed is selected in the basic color display group 121 (S245). When a target basic color to be changed is not selected at S245, a target basic color to be changed is determined (S246), and when a target color has been already selected at S245, the step S246 is omitted.

Next, the basic color change selection screen or a current basic color, which is included in the basic color change selection screen, is displayed on the display device (S247), and then a judgment is made as to whether the basic color is fetched from an editing screen where editing or drawing is in progress (S248). When the basic color is fetched from the editing screen at S248, the editing screen is displayed on the display device (S249), and the color to be changed is selected on the screen (S250).

Meanwhile, when the basic color is not fetched from the editing screen at S248, a judgment is made as to whether a color, which is currently being created in the color mixing area 122, is selected (S251). When the color is selected from the color mixing area 122 at S251, one color in the color mixing area 122 is selected as the basic color (S252), and the display returns to the basic screen. Meanwhile, when the color is not selected from the color mixing area 122 at S250, a color to be changed is selected from the basic color display group 121 (S250), and the display returns to the basic screen. Here, at S250 a color can be selected from both the editing screen and the basic color display group 121.

The following describes the saving/loading process of the basic color at S208.

Figure 46:
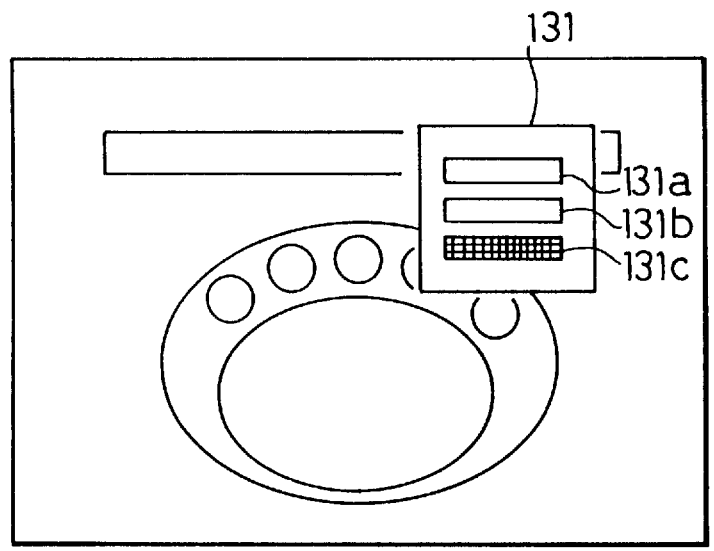
FIG. 46 is an explanatory drawing which shows a selecting screen in the case where basic colors are recorded and called.

When "basic color save/load" of the function selection display group 123 is selected, as shown in FIG. 46, a picture 131 for saving a basic color is displayed on the screen.

Display areas 131a, 131b and 131c are arranged on the picture 131. A currently selected color (mixed color) is displayed in the display area 131a. The color displayed here is going to be loaded, and when this is not the target color to be loaded, a color to be loaded is selected so as to be displayed. A name of a color displayed in the display area 131a is inputted to the display area 131b by a user. Characters or symbols can be used as the name.

In addition, the display area 131c is used for selecting a target place for entrance or selecting a position in the basic color group where the color is loaded. The target place is the storage sections (RAM 105, NVRAM 106) in the processing section 102 or the external storage section 110. After being set/inputted, each item is executed and the target color is loaded.

The following describes the calling process of basic colors at S210.

When "calling of basic colors" of the function selection display group 123 is selected, a picture, which is similar to the picture shown in FIG. 46, is displayed at the time of loading. Similar to the time of loading, after a target color is selected by the input section 101, such as a keyboard and a target place for calling is set, the selection and the setting are executed and a basic color loaded to the external storage section 110, etc. is called. At this time, the specified place for calling is turned to the target basic color. In other words, the calling of a basic color is to change the basic color of the basic color display group 121 on the palette 120.

The following describes the mixing ratio setting process at S212.

The mixing ratio is set by selecting a basic value of the mixing ratio from the function selection display group 123. Here, the basic value is previously set, so it is constant. Therefore, in order to increase the mixing ratio, copying should be carried out a plurality of times. A number of copying times is inputted from the keyboard.

In another method, a pen or a mouse is used as the input section 101. In the case of the pen, the mixing ratio is changed by pen pressure, pressing time of the pen, or a moving speed of the pen. In the case of the mouse, the mixing ratio is changed by pressing-down time of the mouse or based upon a moving speed of a cursor. A rate of the change is proportional to the time or the pen pressure, or logarithmically and exponentially proportional to the time or the pen pressure. As a result, a number of copying times can be reduced compared to the case of the keyboard.

The following describes a method for changing the color mixing ratio by using a pen or a mouse.

Figure 47C:
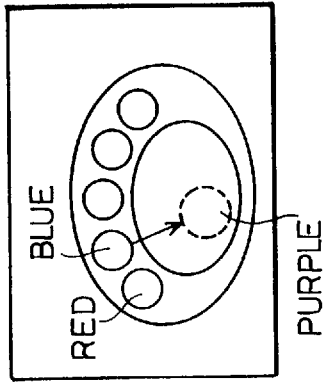
FIG. 47(c) is an explanatory drawing which shows a result of mixing colors in the case where the colors are mixed for a suitable time.
Figure 47B:
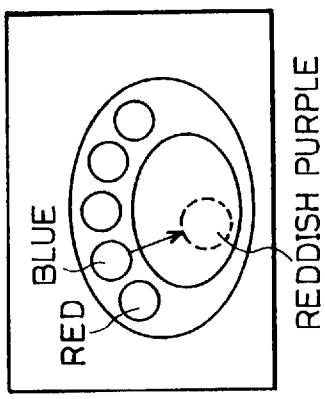
FIG. 47(b) is an explanatory drawing which shows a result of mixing colors in the case where the colors are mixed for a short time.
Figure 47A:
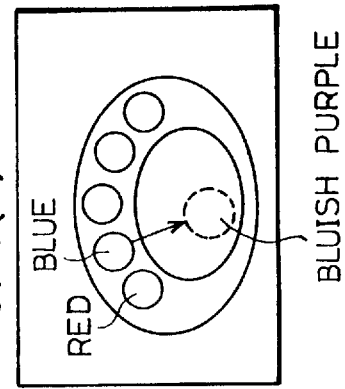
FIG. 47(a) is an explanatory drawing which shows a first color mixing operation.
Figure 47D:
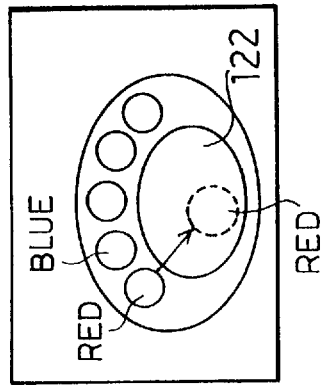
FIG. 47(d) is an explanatory drawing which shows a result of mixing colors in the case where the colors are mixed for a long time.

First, as shown in FIG. 47(a), red is copied to the color mixing area 122. When blue is copied by pressing a pen or a mouse for a short time, or at a fast moving speed, the blue is not mixed with the red very well, and reddish purple is created (see FIG. 47(b)). Meanwhile, when the copying is carried out for a suitable time, desired purple is created (see FIG. 47(c)). Therefore, a desired color can be created by copying at least once. Furthermore, if the copying is carried out for a longer time. The purple is turned into bluish purple (see FIG. 47(d)).

In addition, besides the time changing method, the color mixing ratio can be changed in a mixing manner. For example, as shown in FIG. 48(a), only a certain portion of the red section in the color mixing area 122 is specified by the cursor and the color mixing is carried out. Then, the color mixing is not carried out very well, only the specified portion is turned reddish purple (see FIG. 48(b)). Meanwhile as shown in FIG. 48(c), when a wide portion of the area is specified by the cursor, the color mixing is carried out in the entire originally red portion (see FIG. 48(d)). In this case, a coordinate where the color mixing is carried out in the color mixing area 122 is stored at the first time, and the color mixing ratio is changed according to a distance between the coordinate and a current coordinate.

The following describes a method for obtaining the color mixing ratio.

As to the method for obtaining the color mixing ratio, there exist a method for replacing physical quantities, such as time and pressure, with numerical values and directly converting the numerical values into the color mixing ratio by using a numerical formula, and a method for obtaining the color mixing ratio according to a table shown in FIG. 49.

In the case where the color mixing ratio is obtained by the numerical formula, the numerical formula does not always provide the color mixing ratio which is desired by the user. In this case, the desired color mixing ratio can be obtained by changing a parameter of the numerical formula, but when the parameter increases or the characteristic of the numerical formula is not suitable, it is impossible to comply with the desired color mixing ratio.

Therefore, when the table shown in FIG. 49 is used, for example, the changing ratio can be known, and thus the color mixing ratio can be easily changed. In the example of FIG. 49, the numerical values of the obtained pen pressure are converted into a multiple of the color mixing ratio. As a result, when the color mixing ratio is set for a basic value by using the function selection display group 123, the user can mix colors by changing the degree of the color mixing according to the user's sensitivity. At this time, variations in the color mixing can be obtained without incongruity by changing the degree of the color mixing into a multiple of the basic value.

The values, such as pen pressure, are obtained by converting an analog quantity, which is obtained by a pressure sensor, by means of the analog-digital (AD) conversion or by converting the analog quantity into a pulse and counting a number of pulses within a prescribed time. Moreover, the moving speed and moving time can be obtained by the timer 107.

The following describes the case where not only a color but also a pattern is added as a basic color.

First, a method for creating a pattern is described referring to FIG. 50.

The color mixing area 122 is used for creating a pattern. For example, when red is copied to the color mixing area 122 and blue is mixed therewith, it is set that the blue is not mixed with the color of the color mixing area 122. As a result, a blue locus is drawn on the red color portion. Therefore, if the blue locus forms a circle, the blue circle is drawn on the red background (see FIG. 50(a)). A necessary portion of the color mixing area 122 is taken out as the basic colors and a pattern shown in FIG. 50(b) can be loaded as the basic colors.

Therefore, this pattern is selected and drawing can be carried out by the drawing application. In other words, the color mixing of the pattern can be dealt with in the same manner as that of the above-mentioned color mixing of the colors.

In addition, when the data format shown in FIG. 36(c) is used, a pattern which is currently being created in the color mixing area 122 is the fixed pattern, and the case where a desired pattern, which is the same fixed pattern as the above and whose color is different, is created is considered. In this case, even if the fixed pattern is not displayed by specially using the function selection display group 123, etc., the desired pattern can be created by obtaining only a form of the pattern which is being currently created and by mixing the form to another color.

The following explains an example of color mixing of a pattern referring to FIG. 51.

Figure 51A:
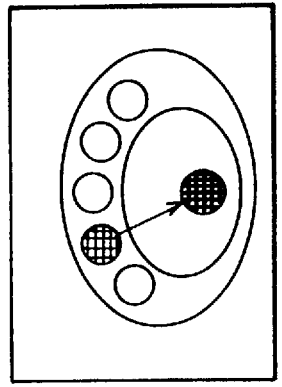
FIG. 51(a) is an explanatory drawing which shows a first operation for mixing colors of a pattern.
Figure 51B:
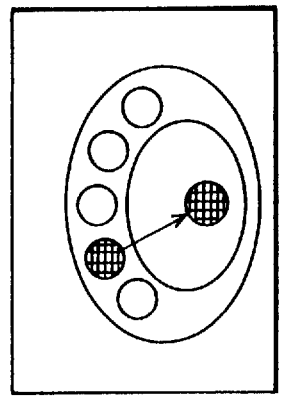
FIG. 51(b) is an explanatory drawing which shows a result of mixing colors in the case of a low color mixing ratio.
Figure 51C:
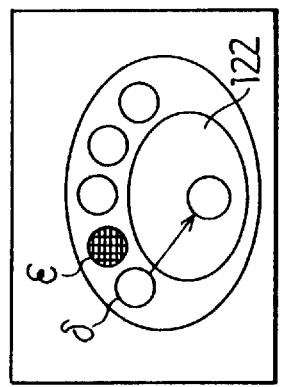
FIG. 51(c) is an explanatory drawing which shows a result of mixing colors in the case of a high color mixing ratio.

First, a color δ is copied to the color mixing area 122 (see FIG. 51(a)). When a pattern ε is selected as a basic color and color mixing is carried out, a pattern is formed according to its color mixing ratio. When the color mixing ratio is small, as shown in FIG. 51(b), a slightly color-mixed pattern is formed. For example, in the case where the color δ is white and the pattern ε is red check with the blue background, a pale pink checked pattern is formed on a pale light blue background. Furthermore, when the color mixing is continued, the pattern becomes dark, and the pink checked pattern is formed on the light blue background (see FIG. 51(c)). In this manner, when a pattern is used, its form is basically saved.

Figure 52:
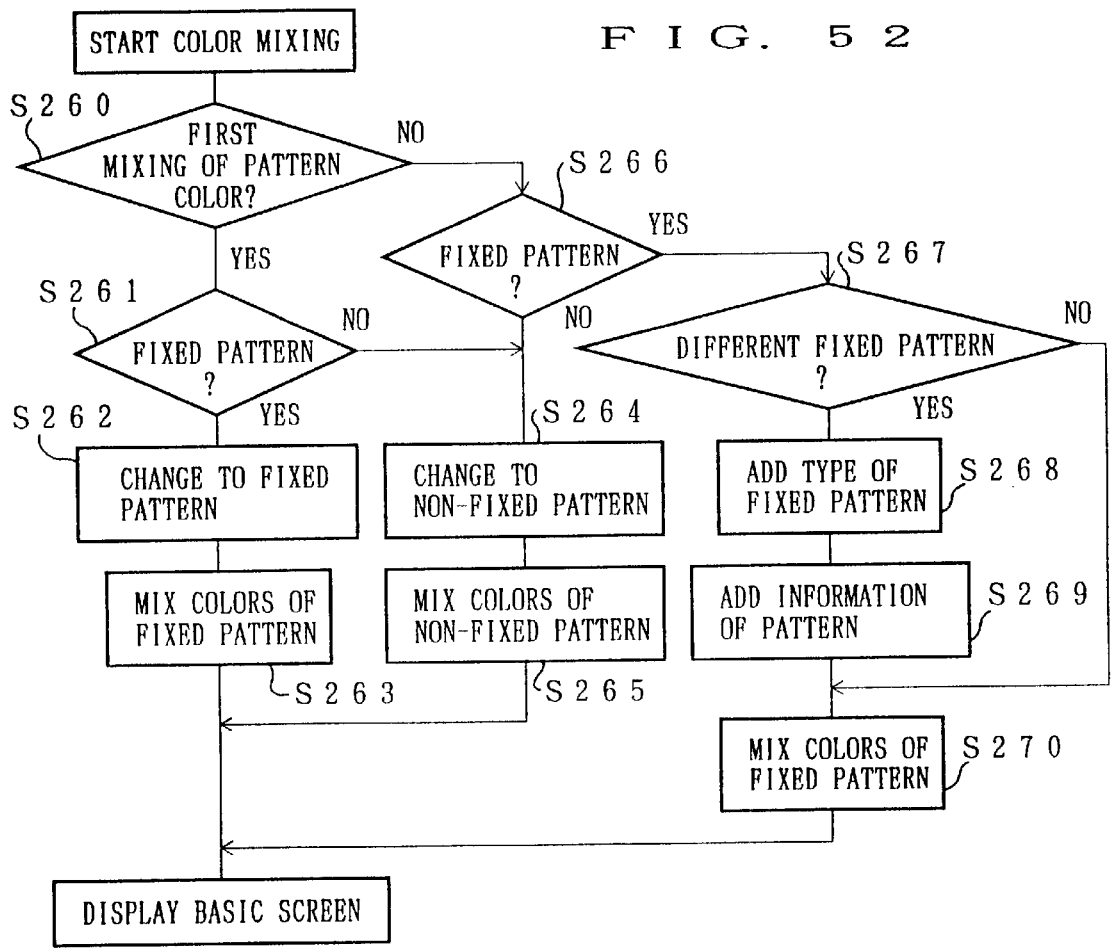
FIG. 52 is a flow chart which shows an operation for mixing colors of a pattern.

The color mixing of the above pattern is described referring to the flow chart of FIG. 52.

First, the process is divided according to current colors of the color mixing area 122. In other words, a judgment is made as to whether pattern color mixing is carried out for the first time (S260). In the case of the first pattern color mixing at S260, namely, in the case where a new pattern is created only with a color in the current color mixing area 122, a judgment is further made as to whether the desired pattern to be mixed is a fixed pattern (S261). When the pattern is the fixed pattern at S261, the content of the judgment memory for the area of a color to be mixed is changed from a color into a fixed pattern (S262), and colors are mixed (S263). Moreover, when the pattern is not a fixed pattern at S261, the content of the judgment memory is changed from a color into a non-fixed pattern (S264), and colors are mixed (S265).

Meanwhile, in the case where it is not the first time to carry out the pattern color mixing at S260, namely, the color of the color mixing area 122 is already a pattern, a judgment is made as to whether the pattern is a fixed pattern (S266). When the pattern is not the fixed pattern at S266, the sequence goes through S264 to S265. When the pattern is a fixed pattern at S266, a judgment is made as to whether a desired pattern to be mixed is a fixed pattern which is different from a fixed pattern currently being displayed in the color mixing area 122 (S267). When the desired pattern is a different fixed pattern at S267, a type of fixed pattern is added to the content of the judgment memory (S268), and information of the fixed pattern to be mixed is added thereto (S269) so that the color mixing is carried out (S270). When the desired pattern is a fixed pattern which is the same as a pattern in the color mixing area 122 at S267, the sequence does not go to S268 and S269 and the color mixing is carried out (S270).

In such a manner, since the color mixing can be carried out with the pattern being distinguished from the colors, an extent of the creation of a mixed color is widened. The judgement of the area of the non-fixed pattern can be made by changing the color of the palette 120 into a color which cannot be created by the color mixing.

In addition, the pattern may be arranged so that color forms, such as a post, mesh, check and rainbow, are displayed by words or drawings on the selection area, such as the function selection display group 123. As a result, the pattern can be processed in the same manner as the basic colors.

For example, the following describes the example of creating the red checked pattern with blue background which is used for explanation of the pattern color mixing. First, a color (blue) previous to creating a check is created by the same method as the general color mixing method. A fixed pattern is displayed by the function selection display group 123, and check is selected. Then, the check is displayed on the basic color display group 121. Here, as to the pattern displayed on the basic color display group 121, an out-of-pattern color is basically a transparent color, and a pattern color is initialized to white or black, etc. The color of the check is changed into red, and the color mixing is carried out in the same manner as the above. Then, the red checked pattern is formed on the blue background. Here, the out-of-pattern color can be changed in the same manner.

Figure 53:
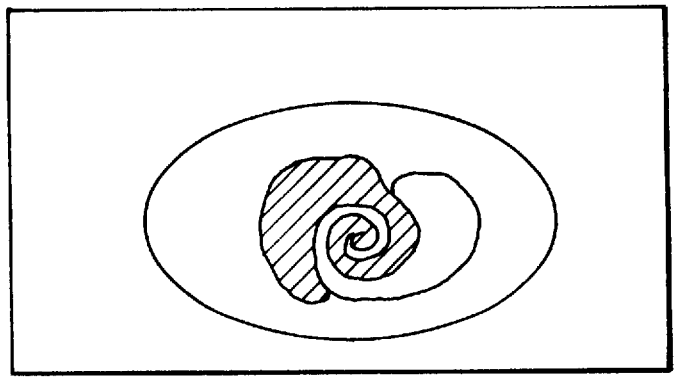
FIG. 53 is an explanatory drawing which shows a result of moving a cursor in the case color mixing is not set in the water colors-like mixing method.

In addition, an example of the creation of another patter n is described. In the water color-like color mixing method, the color mixing is not set, and as shown in FIG. 42(b), a locus 124 is drawn. Then, as shown in FIG. 53, a locus is drawn with each color being separated. At this time, the data, such as pen pressure, are not used as the data of the color mixing ratio, and the data, such as pen pressure, are converted into the size of the cursor. Therefore, for example, when the tool force is strong, a thick locus is drawn, and when the tool force is weak, a thin locus is drawn (see FIG. 53). In such a manner, the pattern can be created in the color mixing area 122.

In the present embodiment, the selection, changing, setting, etc. of the functions are executed by the input section 101, such as a keyboard, mouse and pen, but the selection also can be made by gesture using the input section 101.

The gesture relates to a kind of symbols, such as characters and drawings, and the symbols a rerepresented by procedures. In other words, the gesture encompasses operating means for drawing the symbols as a locus according to the procedure by using the input section 101 so as to be able to execute functions and selections which are defined by the symbols. The data of the gesture are stored in the data type area.

In the case where basic colors to be loaded are inputted to the display area 131b shown in FIG. 46, for example, the basic colors can be also loaded by characters, drawings and procedures of the gesture. In this case, when the characters or the drawings are drawn according to the procedure during the color mixing, the basic colors corresponding to them are called, thereby making it possible to use the basic colors for the color mixing.

Figure 54:
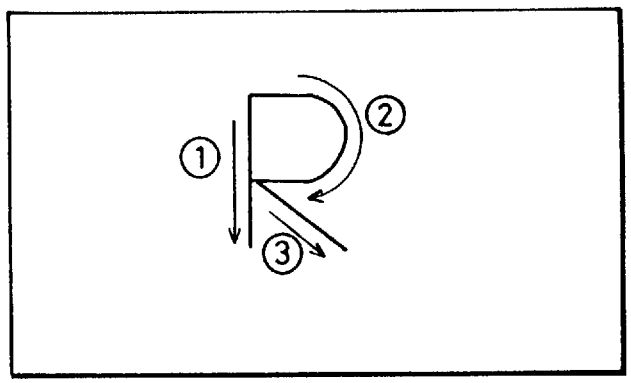
FIG. 54 is an explanatory drawing which shows an example of a gesture.

For example, red is set by the gesture shown in FIG. 54. When "R" is drawn during the color mixing by moving the cursor on the screen following the procedures ①, ② and ③ shown in FIG. 54, the processing section 102 judges what the color defined by this gesture is called, and the color of the cursor is turned into red.

Figure 55:
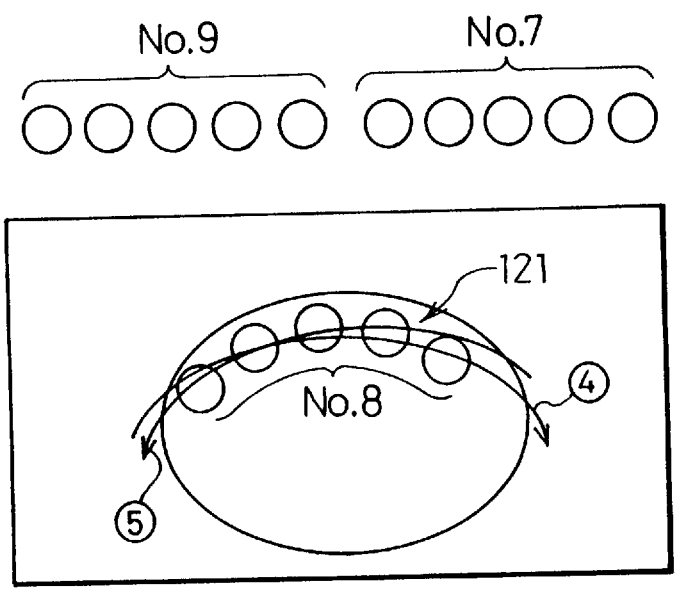
FIG. 55 is an explanatory drawing which shows basic colors replacing operation by a gesture.

The case where the basic colors are changed by the gesture is described referring to FIG. 55.

When the cursor is moved on the basic color display group 121 from left to right (in the direction of the arrow ④ in the drawing), namely, from a color to a color, a numeral of the basic color group, which is given for the convenience of the process on the basic colors currently displayed, is replaced by a larger numeral of a basic color group. For example, if a basic color group No. 8 is currently displayed, the basic color group No. 8 is replaced with a basic color group No. 9. In the case of a basic color group with the biggest numeral, it is replaced by a basic color group with the smallest numeral.

On the contrary, when the cursor is moved from right to left (in the direction of the arrow ⑤ in the drawing), a basic color group with a bigger numeral is replaced by a basic color group with a smaller numeral. For example, if a basic color group No. 8 is currently displayed, the basic color group No. 8 is replaced by a basic color group No. 7. In the case of a basic color group with the smallest numeral, it is replaced by a basic color group with the biggest numeral.

In addition, another calling method is as follows. During color mixing by means of a word processor, etc., kana-kanji conversion is used only for entering characters during creation of a pattern. Therefore, in the case where basic colors are changed by key entering, for example, when basic colors and a basic color group are specified, the colors can be called in the similar manner to the kana-kanji conversion of the word processor, etc. by inputting names of the colors or color tone with hiragana. Moreover, not only colors but also a fixed pattern can be called in the same manner.

More specifically, a name of a color or color tone, a name of a fixed pattern, etc. is inputted with hiragana by a keyboard, etc. of the input section 101 so as to be converted. Then, the processing section 102 obtains parameters of the corresponding color on referring to FIG. 44, and retrieves from the ROM 104, the RAM 105, and the NVRAM 106 so as to obtain a basic color which satisfies the condition of the obtained parameters. The color obtained in such a manner is displayed as a proposed color. Also in the case of a pattern form, the processing section 102 retrieves a pattern form so as to display a proposed form. When the proposed color or form is correct, the obtained color or pattern are data of the cursor or the basic color.

Figure 56:
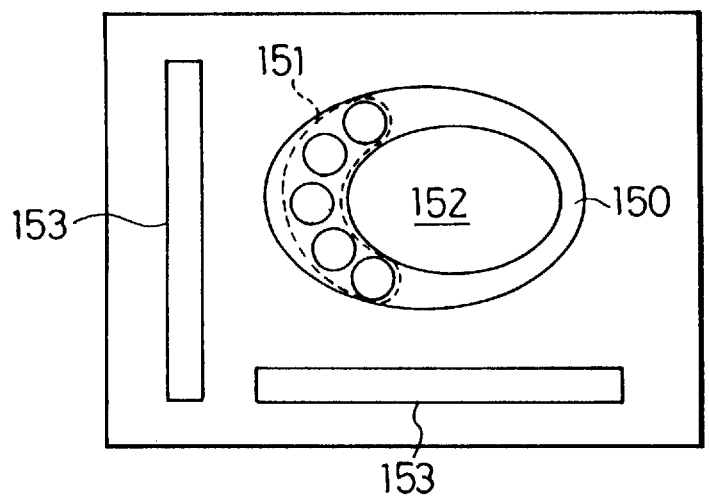
FIG. 56 is an explanatory drawing which shows another example of the basic screen.

FIG. 56 shows another example of the basic screen. On the basic screen, a function selection display group 153 is positioned on the left side and under the palette 150. Moreover, a basic color display group 151 is positioned on the left portion in the palette 150, and a color mixing area 152 is positioned at the center of the palette 150. The above functions of each component are the same as those explained in FIG. 1, so the description thereof is omitted.

In the image output device of the present embodiment, since the basic screen has a similar shape to that of the palette for water colors, colors can be mixed in like manner that a user actually mixes colors on a palette. In other words, when actual forms of a palette and color arrangements are reproduced, the user can manage the operation remembering one's experience. Therefore, the user can naturally operate the apparatus without any confusion.

In addition, basic colors are directly selected by a pen, a mouse, a keyboard, etc. and the basic colors can be arranged in the color mixing area. As a result, in the case where the basic colors are specified, since the image output device of the present embodiment specifies colors themselves so as to select them, the operational environment is more natural, and thus even a beginner can easily operate the apparatus without hesitation compared to a conventional apparatus for inputting a number of a color so as to specify basic colors.

In addition, while changes in brightness and saturation of the color mixing results are being checked on the screen, desired colors can be created, thereby expecting the cultivation of aesthetic sensitivity.

Furthermore, in the color mixing area, color mixing can be carried out simultaneously in a plurality of places if necessary. As a result, when the created mixed color is again specified as basic color in another place in the color mixing area, it can be used as the basic color. In other words, the mixing color can be mixed with the mixed color or the mixed color can be mixed with the basic color so that another mixing color can be created. Therefore, a variety of colors can be created.

In addition, in the case where colors are created in the color mixing area, the color mixing results vary with time to touch a color mixing portion with a stylus pen, etc. and strength of the contacting pressure. Therefore, while their changes are being checked, a desired color can be created when the pen is removed from the screen at the moment the desired color is displayed. As a result, a desired color can be created by operating at least once.

In addition, color mixing results can be displayed on the color mixing area quickly and automatically according to motion of the stylus pen by the water color-like color mixing method. As a result, the color mixing results can be successively displayed more practically and naturally.

Furthermore, when modification parameters of original color data corresponding to words representing images, such as "deep", "light", "warm" and "cool", are prepared, original data are corrected according to the modification parameters of the words by inputting or specifying the words, and a mixed color can be created sensuously. In such a manner, since the color mixing result can be adjusted by selecting the words which describe colors, the trouble of adjustments is omitted. Moreover, even a user who has no special knowledge of colors can create a desired color more accurately compared to a conventional method for numerically adjusting a color mixing result, namely, adjusting a distribution ratio.

In addition, a color mixing result can be saved, called, etc. by gesture. Moreover, such gesture makes it possible to replace basic colors quickly and simply per color or group. Furthermore, the basic colors can be replaced per color or group by inputting a name of a color or color tone, etc. with hiragana in like manner of entering kanji using kana-kanji conversion.

In addition, names are given to created colors and then the created colors can be saved. The saved results can be used by displaying them as the basic colors on a palette. Moreover, information other than color data (coloring pattern) is added to the created mixed colors and the mixed colors are saved so that they can be applied. As a result, a variety of mixed colors can be created.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image output device, comprising:

an input unit including structure enabling inputting a type and an image of a document;

a storage device previously storing data including types of documents, a word group representing images of documents corresponding to the types of documents and display forms corresponding to each word in the word group;

a converter communicating with said input unit and said storage device, said converter converting the inputted type and image of the document into corresponding display form data in accordance with the data stored in said storage device; and a display communicating with said converter, said display displaying a color image based upon the display form data.

2. The image output device as defined in claim 1, wherein:

said storage device stores a type table including the types of the documents, an image table including the word group representing the images of the documents corresponding to the types of the documents and an image color arrangement conversion table including color arrangements and typefaces corresponding to each word in the word group, said converter comprises a type image converter that converts the inputted type by said input unit into the corresponding word group by retrieving the image table, and an image color arrangement converter that converts the image inputted by said input unit into corresponding color arrangement and typeface by retrieving the image color arrangement conversion table.

3. The image output device as defined in claim 1, wherein said converter, when the type of the document is inputted as a character string, converts the character string into a type of a document, which is previously stored in the storage device and is same as or similar to the character string.

4. The image output device as defined in claim 1, wherein said converter, when the image of the document is inputted as a character string, converts the character string into an image of a document, which is previously stored in the storage means and is same as or similar to the character string.

5. The image output device as defined in claim 1, wherein said display form data are color arrangement data of gradation which is a pattern whose brightness, hue or saturation continuously changes.

6. The image output device as defined in claim 5,
wherein said color arrangement data are data of a start color of the gradation, and an end color of the gradation,
said image output device further comprising a color calculating device that refers to the data and calculates a color between two colors according to a number of splits in the area between the start color and the end color.

7. The image output device as defined in claim 5, wherein said storage device includes a color arrangement data storage section storing a series of the color arrangement data of the gradation as a pattern, and
wherein when the number of times the pattern is repeated is inputted by said input, the pattern of the gradation is repeatedly displayed on said display only the number of times.

8. The image output device as defined in claim 5, wherein said input selectively specifies whether a target area where the gradation is drawn is a background or an inner section of an objective design.

9. The image output device as defined in claim 5, further comprising:
a setting device that sets a range of drawing the gradation,
wherein when said input unit inputs a starting position and an end position of the gradation, the gradation is drawn between the start position and the end position on the display.

10. The image output device as defined in claim 9, wherein an outer area out of the range of the gradation, colors, which are estimated based upon the gradation of the area in the end position-to-start position direction, are displayed in the outer area from the start position, and colors, which are estimated based upon the gradation of the area in the start position-to-end position direction, are displayed in the outer area from the end position.

11. The image output device as defined in claim 9, further comprising a color transition setting device that calculates color transition of the gradation according to a locus which shows a changing amount of the gradation obtained by specifying coordinate positions along a direction where colors change.

12. The image output device as defined in claim 9, further comprising a color transition setting device that, when a locus is drawing in the area specified range of the gradation by said input, calculates a Y coordinate value, which is at a right angle to a direction of X where the gradation continuously changes, according to an X coordinate value obtained when the locus is equally divided in the direction of X, calculates intervals of each Y coordinate value, and obtains a ratio of each interval to a length of the direction of Y of the area so as to calculate a width of each color in the gradation.

13. The image output device as defined in claim 1, wherein said display form data are color arrangement data of a rainbow comprising a color band group composed of plural colors.

14. The image output device as defined in claim 13, further comprising a color transition setting device that calculates color transition of the rainbow according to a locus which shows a changing amount of the rainbow obtained by specifying coordinate positions along a direction where colors change.

15. The image output device as defined in claim 13, further comprising a color transition setting device that, when a locus is drawing in the area specified range of the rainbow by said input, calculates a Y coordinate value of the locus in a direction of Y, which is at a right angle to a direction of X where the rainbow colors change, according to an X coordinate value obtained when the locus is equally divided in the direction of X, calculates intervals of each Y coordinate value, and obtains a ratio of each interval to a length of the direction of Y of the area so as to calculate a width of each color of the rainbow.

16. The image output device as defined in claim 13, wherein said storage device includes a color arrangement data storage section for storing a series of the color arrangement data of the rainbow as a pattern, and
wherein when the number of times the pattern is repeated is inputted by said input, the pattern of the rainbow is repeatedly displayed on said display the number of times.

17. The image output device as defined in claim 13, wherein said input selectively specifies whether a target area where the rainbow is drawn is a background or an inner section of an objective design.

18. The image output device as defined in claim 13, further comprising:
a setting device that sets a range of drawing the rainbow,
wherein when a start position and an end position of the rainbow are inputted by the input, the rainbow is drawn between the start position and the end position on said display.

19. The image output device as defined in claim 18, wherein in an outer area out of the range of drawing the rainbow, the same color as the start position is displayed in the outer area on the start position side, and the same color as the end position is displayed in the outer area on the end position side.

20. An image output device comprising:
input means for specifying colors;
processing means for creating a mixed color by mixing a plurality of colors according to data from said input means;
storage means for previously storing data of basic colors and for storing the data from said input means and data of the created mixed color; and
display means for outputting a display screen where a basic color display area and a color mixing area are positioned, a plurality of basic colors being displayed in said basic color display area according to the data stored in said storage means, said color mixing area having a plurality of areas where a plurality of colors specified by said input means are mixed, the created mixed color being displayed in said color mixing area according to the data stored in said storage means, wherein:

said input means includes target specifying means for specifying a target color by moving the target specifying means on the display screen, and as a locus is drawn by moving said target specifying means, a mixed color of the passed colors is created on the display screen where said target specifying means has passed.

21. The image output device as defined in claim 20, wherein:

an image palette, which graphically represents a real palette to be used for drawing a picture, is displayed on said display screen, the basic color display area and the color mixing area are arranged within the image palette so that the basic color display area is above the color mixing area.

22. The image output device as defined in claim 21, wherein a color of the image palette cannot be set as the basic color or mixed color.

23. The image output device as defined in claim 20, wherein:

an image palette, which graphically represents a real palette to be used for drawing a picture, is displayed on the display screen, the basic color display area and the color mixing area are arranged within the image palette so that the basic color display area is on the left side of the color mixing area.

24. The image output device as defined in claim 20, wherein in the color mixing area, the basic colors displayed in the basic color display area are mixed, the created mixed color and the basic colors are mixed or the mixed colors are mixed.

25. The image output device as defined in claim 20, wherein:

said input means includes target specifying means for specifying a target color by moving the target specifying means on the display screen, said processing means includes comparison means for comparing the color of the target specifying means with the color on the color mixing area, when a judgment is made that the two colors compared by the comparison means are different, the color of the target specifying means is mixed with the color on the color mixing area so that a mixed color is created.

26. The image output device as defined in claim 20, wherein:

said storage means includes a table composed of words representing images and data of basic colors corresponding to the words, the basic colors are displayed by inputting a word representing an image of target basic colors by said input means.

27. The image output device as defined in claim 26, wherein necessary basic colors used for creating a target mixed color are displayed by inputting a word representing an image of the target mixed color by said input means.

28. The image output device as defined in claim 20, wherein said storage means loads the mixed color created in the color mixing area as the basic colors therein.

29. The image output device as defined in claim 20, wherein a ratio of the mixed colors changes according to time for said input means specifying colors in the color mixing area.

30. The image output device as defined in claim 20, wherein a ratio of the mixed colors changes according to time for said input means moving between colors when specifying a plurality of colors in the color mixing area.

31. The image output device as defined in claim 20, wherein a ratio of the mixed color changes according to a strength of touching pressure by said input means on the display screen when said input means specifies colors in the color mixing area.

32. The image output device as defined in claim 20, wherein a ratio of the mixed color changes according to a range that said input means moves on colors when said input means specifies colors in the color mixing area.

33. The image output device as defined in claim 20, wherein:

said storage means includes a table composed of numerical values according to a physical quantity of a state that said input means specifies a mixed color and multiple values according to the numerical values, when the state that said input means specifies a mixed color is changed, a basic mixing ratio is multiplied by a multiple value according to the state so that a ratio of the specified mixed colors is changed.

34. An image output device comprising:

input means for specifying colors;

processing means for creating a mixed color by mixing a plurality of colors according to data from said input means;

storage means for previously storing data of basic colors and for storing the data from said input means and data of the created mixed color; and display means for outputting a display screen where a basic color display area and a color mixing area are positioned, a plurality of basic colors being displayed in said basic color display area according to the data stored in said storage means, said color mixing area having a plurality of areas where a plurality of colors specified by said input means are mixed, the created mixed color being displayed in said color mixing area according to the data stored in said storage means, wherein:

not less than two colors selected from arbitrary colors including a transparent color are used and a pattern, which is a color form where a design is formed according to a difference in the colors, is displayed on the display screen, data of the pattern includes a first area including information as to a color used for the pattern, and a second area including information as to a form of the pattern, said data of the pattern being also stored in said storage means, and when the colors and the pattern are specified by said input means, the colors and the pattern are mixed, a resulting color of the pattern being determined based on a color representing the information stored in said first area for the data of the pattern, and a color specified by said input means.

35. An image output device comprising:

input means for specifying colors;

processing means for creating a mixed color by mixing a plurality of colors according to data from said input means;

storage means for previously storing data of basic colors and for storing the data from said input means and data of the created mixed color; and display means for outputting a display screen where a basic color display area and a color mixing area are positioned, a plurality of basic colors being displayed in said basic color display area according to the data stored in said storage means, said color mixing area having a plurality of areas where a plurality of colors specified by said input means are mixed, the created mixed color being displayed in said color mixing area according to the data stored in said storage means, wherein:

said storage means includes a judgment memory for storing color data and data of a pattern, which is a color form where a design is formed according to differences in not less than two colors selected from arbitrary colors including a transparent color, said processing means including discriminating means for discriminating the color data from the pattern data by reading the data in the judgment memory.

36. An image output device comprising:

input means for specifying colors;

processing means for creating a mixed color by mixing a plurality of colors according to data from said input means;

storage means for previously storing data of basic colors and for storing the data from said input means and data of the created mixed color; and display means for outputting a display screen where a basic color display area and a color mixing area are positioned, a plurality of basic colors being displayed in said basic color display area according to the data stored in said storage means, said color mixing area having a plurality of areas where a plurality of colors specified by said input means are mixed, the created mixed color being displayed in said color mixing area according to the data stored in said storage means, wherein:

said input means includes target specifying means for specifying a target color by moving the target specifying means on the display screen, said target specifying means passes a plurality of colors in the color mixing area and draws a locus so that a pattern is formed according to the locus, and said processing means, while being set in a non-color-mixing mode, forms a pattern according to a locus of said target specifying means within the color mixing area on the display screen as the user manipulates said target specifying means to pass a plurality of colors on the color mixing area.

37. The image output device as defined in claim 36, wherein a form of the pattern changes according to a physical quantity in the state where said input means draws the locus.

38. The image output device as defined in claim 34, wherein:

said storage means stores a gesture indicated by symbols representing the basic colors and a procedure for drawing the symbols, when the gesture is drawn on the display screen by said input means, the basic colors are displayed.

39. The image output device as defined in claim 34, wherein:

said input means includes target specifying means for specifying a target color by moving the target specifying means on the display screen, said target specifying means passes a basic color group in the basic color display area so that the basic colors are replaced by group.

40. The image output device as defined in claim 34, wherein:

said storage means includes hiragana and a corresponding kanji dictionary, when words representing desired basic colors are inputted with hiragana by said input means, the basic colors in the basic color display area are replaced by color or group.

41. An image output device, comprising:

input means for inputting a type and an image of a document;

storage means previously storing data including types of documents, a word group representing images of documents corresponding to the types of documents, and display forms corresponding to each word in the word group;

converting means communicating with said input means and said storage means for converting the inputted type and image of the document into corresponding display form data in accordance with the data stored in said storage means; and display means communicating with said converting means for displaying a color image based upon the display form data.

42. A method of operating an image output device to display a color image, the method comprising:

inputting a type and an image of a document;

previously storing data including types of documents, a word group representing images of documents corresponding to the types of documents, and display forms corresponding to each word in the word group;

converting the inputted type and image of the document into corresponding display form data in accordance with the previously stored data; and displaying a color image based upon the display form data.

* * * * *